(12) United States Patent
Walker et al.

(10) Patent No.: US 10,481,439 B2
(45) Date of Patent: Nov. 19, 2019

(54) SYSTEM AND METHOD FOR PROTECTING A LIQUID CRYSTAL DISPLAY BY CONTROLLING ION MIGRATION

(71) Applicant: OmniVision Technologies, Inc., Santa Clara, CA (US)

(72) Inventors: Christopher Morgan Walker, Boulder, CO (US); Libo Weng, San Jose, CA (US); Oray Orkun Cellek, Mountain View, CA (US); Ming Zhang, Fremont, CA (US); Yin Qian, Milpitas, CA (US); Dyson Hsin-Chih Tai, San Jose, CA (US); Regis Fan, Shanghai (CN)

(73) Assignee: OmniVision Technologies, Inc., Santa Clara, CA (US)

( * ) Notice: Subject to any disclaimer, the term of this patent is extended or adjusted under 35 U.S.C. 154(b) by 248 days.

(21) Appl. No.: 15/357,920

(22) Filed: Nov. 21, 2016

(65) Prior Publication Data

US 2018/0144710 A1 May 24, 2018

(51) Int. Cl.
*G09G 3/36* (2006.01)
*G02F 1/1337* (2006.01)
(Continued)

(52) U.S. Cl.
CPC ...... *G02F 1/133753* (2013.01); *G02F 1/1337* (2013.01); *G02F 1/133711* (2013.01);
(Continued)

(58) Field of Classification Search
CPC ............... G02F 1/1337; G02F 1/13375; G02F 1/133788; G02F 1/136213;
(Continued)

(56) References Cited

U.S. PATENT DOCUMENTS

2005/0260426 A1  11/2005  Kwok et al.
2008/0055529 A1*  3/2008  Shirasaka ......... G02F 1/134309
                                             349/143
(Continued)

FOREIGN PATENT DOCUMENTS

JP         2012123144 A       6/2012

OTHER PUBLICATIONS

Stojmenovik, Goran; *Ion Transport and Boundary Image Retention in Nematic Liquid Crystal Displays*; Universiteit Gent; Vakgroep Elektronica en Informatiesystemen; Faculteit Toegepaste Wetenschappen; Academiejaar 2004-2005; Section Nos. 4.2.2-4.2.4.
(Continued)

*Primary Examiner* — Afroza Chowdhury
(74) *Attorney, Agent, or Firm* — Larry E. Henneman, Jr.; Henneman & Associates, PLC

(57) ABSTRACT

A liquid crystal display includes a display area and a border area at least partially surrounding the display area, where the display area displays images for viewing and the border area displays display-protection images, which are used to control ion migration in the liquid crystal layer. In a more particular embodiment, the border area displays a series of checkerboard pattern(s), where the checkerboard patterns can alternate between initial and inverted values. The display-protection images protect the liquid crystal display from migrating ions accumulating in particular regions of the pixel array and causing permanent defects in the display area. A liquid crystal display that includes a liquid crystal alignment layer having a plurality of liquid crystal alignment directions is also disclosed. The customized liquid crystal alignment director(s) over the border area promote ion migration away from the display area.

25 Claims, 20 Drawing Sheets

(51) Int. Cl.
*G02F 1/137* (2006.01)
*G02F 1/1333* (2006.01)

(52) U.S. Cl.
CPC .. *G02F 1/133719* (2013.01); *G02F 1/133723* (2013.01); *G02F 1/133734* (2013.01); *G02F 1/133788* (2013.01); *G02F 2001/133388* (2013.01); *G02F 2001/133757* (2013.01); *G02F 2001/133769* (2013.01); *G02F 2001/133776* (2013.01); *G02F 2201/501* (2013.01); *G02F 2202/36* (2013.01); *G02F 2203/01* (2013.01); *G09G 2300/0426* (2013.01)

(58) Field of Classification Search
CPC ........ G02F 2001/133388; G02F 2001/133757; G02F 2201/50; G02F 2201/501; G02F 2202/36; G02F 2203/01; G09G 2300/0426; G09G 2310/0232; G09G 3/3655
See application file for complete search history.

(56) References Cited

U.S. PATENT DOCUMENTS

| | | |
|---|---|---|
| 2010/0118246 A1 | 5/2010 | Nakagawa |
| 2013/0027446 A1* | 1/2013 | Nishida ................ G09G 3/3648 345/697 |
| 2014/0160413 A1* | 6/2014 | Nishida ................ G02F 1/1337 349/123 |
| 2014/0253854 A1 | 9/2014 | Inage et al. |
| 2014/0285754 A1 | 9/2014 | Lee et al. |
| 2016/0282646 A1* | 9/2016 | Liu .................. G02F 1/133514 |

OTHER PUBLICATIONS

U.S. Appl. No. 15/428,307, Office Action dated Dec. 5, 2018.

* cited by examiner

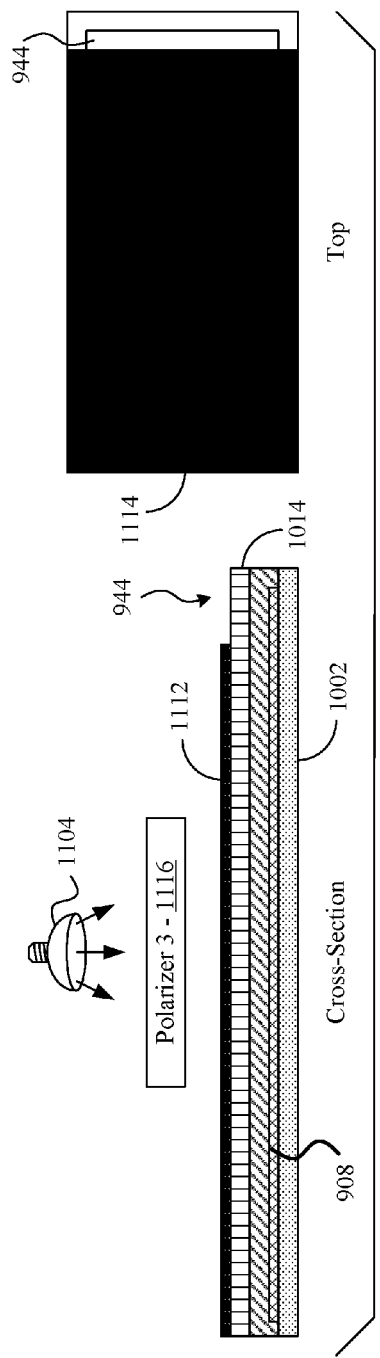
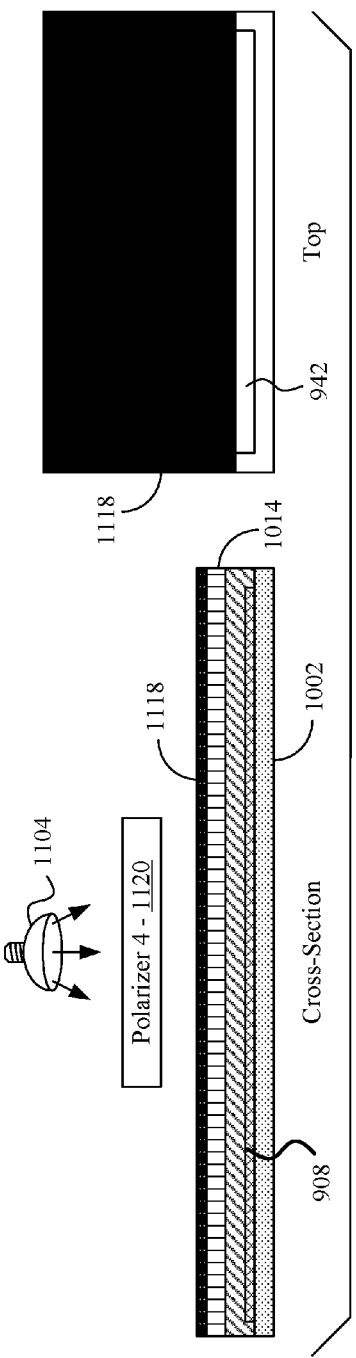
FIG. 11E
FIG. 11F

SYSTEM AND METHOD FOR PROTECTING A LIQUID CRYSTAL DISPLAY BY CONTROLLING ION MIGRATION

BACKGROUND OF THE INVENTION

Field of the Invention

This invention relates generally to liquid crystal displays, and more particularly to controlling ion migration in the liquid crystal layer of a liquid crystal display.

Description of the Background Art

Reflective and transmissive liquid crystal displays (LCDs) are used in video projectors, rear projection televisions, computer displays, and other devices as a means for producing high-quality imagery. One type of LCD is a liquid crystal on silicon (LCOS) display. Such LCOS displays typically include a silicon substrate, integrated circuitry, a plurality of pixel mirrors, and a liquid crystal layer disposed between the pixel mirrors and an opposite transparent electrode formed on a transparent substrate. Alignment layers are formed over the pixel mirrors and over the transparent substrate to align the liquid crystals in the liquid crystal layer in desired directions (e.g., rub directions).

During operation of the LCOS display, light passes through the liquid crystal layer (and other layers) to impinge on the pixel mirrors. The light is reflected from the top surfaces of the pixel mirrors and then exits the device again through the liquid crystal. The polarization of the light is altered by liquid crystal layer, depending on the electric field applied across liquid crystal layer between respective pixel mirrors and the common electrode. Such light is typically passed through a polarizer to analyze the image asserted on the pixel mirrors so that the image can be displayed.

The liquid crystal layer of such LCOS displays (and also those of other LCD devices) degrades over time. Indeed, even after several hundred hours of operation, LCD devices often display such non-uniformity problems as image retention or sticking, flares (unwanted lighter areas), edge bleeding, permanent black (PB) areas, etc. These defects result in diminished optical performance, costly warranty repairs/recalls, and/or lost customers.

What is needed, therefore, is a means to significantly reduce the occurrence of one or more of these display-degrading phenomena. What is also needed is a means to make a liquid crystal display more robust and have a longer lifetime.

SUMMARY

The present invention overcomes the problems associated with the prior art by providing a display device and method that facilitates driving a border area surrounding a display area of a pixel array with display-protection images. The display-protection images impose barriers to ion migration and allow ion migration to be controlled in the liquid crystal layer, which prevent ions from accumulating in corners of the liquid crystal display and causing permanent defects. The present invention also overcomes the problems associated with the prior art by providing a display device that includes a border area with liquid crystal alignment direction(s) that promote ion migration away from the display area.

A liquid crystal display according to the invention includes a pixel array, a liquid crystal layer disposed over the pixel array, and a controller coupled to receive image data and being operative to drive a first set of pixels defining a display area of the pixel array based on the image data and to drive a second set of pixels defining a border area of the pixel array based on display-protection data. The pixels of the display area are driven to display images corresponding to the image data, which are intended to be viewed by an audience, whereas the pixels of the border area are driven to display display-protection images corresponding to the display-protection data. The display-protection images inhibit ion migration in the liquid crystal layer, and in a particular embodiment comprise a series of checkerboard patterns.

In a particular embodiment, the border area at least partially surrounds the display area. Optionally, the pixels of the border area can have a smaller area than the pixels of the display area. Also optionally, the pixel array can include an ion reservoir at least partially surrounding the border area where the liquid crystal layer is disposed over the ion reservoir. The ion reservoir area is configured to receive and retain ions migrating in the liquid crystal layer.

In another particular embodiment, the controller is further operative to define a plurality of groups of pixels in the border area and drive each of the plurality of groups of pixels differently based on the display protection data. More specifically, the plurality of groups of pixels can include a first group of pixels and a second group of pixels, and the controller is operative to cause a first voltage to be asserted on each of the pixels of the first group and a second voltage to be asserted on each of the pixels of the second group during a first time interval to cause a first predetermined voltage to be applied across the liquid crystal layer for each of the pixels of the first group and a second predetermined voltage to be applied across the liquid crystal layer for each of the pixels of the second group. The controller can thereafter cause a third voltage to be asserted on each of the pixels of the first group and a fourth voltage to be asserted on each of the pixels of the second group during a second time interval following the first time interval to cause the second predetermined voltage to be applied across the liquid crystal layer for each of the pixels of the first group and the first predetermined voltage to be applied across the liquid crystal layer for each of the pixels of the second group. In yet another embodiment, the controller can define a plurality of regions within the border area, define a plurality of groups of pixels within each of the regions, and drive each of the groups of pixels differently based on which region the group of pixels is located in.

In other particular embodiments, the liquid crystal display includes a liquid crystal alignment layer that defines a first liquid crystal alignment direction over the display area of the pixel array and a second liquid crystal alignment direction over the border area, where the second liquid crystal alignment direction is different than the first alignment direction. Optionally, the liquid crystal alignment layer can define a plurality of liquid crystal alignment directions over the border area, where each of the plurality of liquid crystal alignment directions over the border area is different than the first liquid crystal alignment direction. Each of the plurality of liquid crystal alignment directions over the border area can be selected to promote ion migration in the liquid crystal layer away from the display area.

A method for driving a liquid crystal display having a pixel array and a liquid crystal layer disposed over the pixel array is also disclosed. The method includes the steps of defining a display area of the pixel array, where the display area is associated with a first set of pixels of the pixel array, and defining a border area of the pixel array, where the border area is associated with a second set of pixels of the pixel array. The method further includes receiving image data and display-protection data, driving the first set of pixels based on the image data to display images intended to be viewed by an audience on the display area, and driving the second set of pixels based on the display-protection data to display display-protection images on the border area. The display-protection images inhibit ion migration in the liquid crystal layer.

A particular method includes the steps of defining a plurality of groups of pixels in the border area and driving each of the plurality of groups of pixels differently based on the display-protection data. More particularly, the method can include the steps of asserting a first voltage on each of a first group of pixels of the border area during a first time interval to cause a first predetermined voltage to be applied across the liquid crystal layer for each of the pixels of the first group, and asserting a second voltage on each of a second group of pixels of the border area during the first time interval to cause a second predetermined voltage to be applied across the liquid crystal layer for each of the pixels of the second group. Thereafter, the method can include asserting a third voltage on each of the pixels of the first group during a second time interval following the first time interval to cause the second predetermined voltage to be applied across the liquid crystal layer for each of the pixels of the first group, and asserting a fourth voltage on each of the pixels of the second group during the second time interval to cause the first predetermined voltage to be applied across the liquid crystal layer for each of the pixels of the second group. Furthermore, at least one of the first voltage, the second voltage, the third voltage, and the fourth voltage, the duration of the first time interval, and the duration of the second time interval can be selected to affect at least one of the speed and direction of ion migration in the liquid crystal layer. Yet another method can further include the steps of defining a plurality of regions within the border area, defining a plurality of groups of pixels within each of the regions, and driving each of the groups of pixels differently based on which region the group of pixels is located in.

In still another particular method, the step of driving the second set of pixels further includes driving the second set of pixels based on a liquid crystal alignment direction of the liquid crystal layer over the second set of pixels.

A method for manufacturing a liquid crystal display is also disclosed. Such a method includes the steps of providing a substrate, forming a first set of pixels on the substrate, where the first set of pixels correspond to a display area of a pixel array, and forming a second set of pixels on the substrate, where the second set of pixels corresponds to a border area of the pixel array. The method also includes the steps of forming circuitry facilitating the assertion of image data on the first set of pixels to display images intended to be viewed by an audience, forming circuitry facilitating the assertion of display protection images on the second set of pixels, and forming at least one ion-migration control feature on the substrate and at least partially surrounding the first set of pixels. In a particular method, the step of forming the at least one ion-migration control feature includes forming at least one ion reservoir at least partially surrounding the border area. In another particular method, the border area at least partially surrounds the display area and the step of forming the at least one ion-migration control feature comprises forming at least some of the pixels of the second set to be smaller than adjacent pixels of the first set.

Optionally, the step of forming the at least one ion-migration control feature can include forming a liquid crystal alignment layer over the substrate, where the liquid crystal alignment layer defines a first liquid crystal alignment direction over the display area and a second liquid crystal alignment direction over the border area that is different than the first alignment direction. More particularly, the method can include defining a plurality of regions within the border area, and the step of forming the liquid crystal alignment layer can include forming a plurality of liquid crystal alignment directions over the border area, where each is different than the first alignment direction. Additionally, each of the liquid crystal alignment directions over the border area can be selected to promote ion migration away from the display area.

The invention also is directed to a liquid crystal display device that includes a substrate, a pixel array formed on the substrate, and a liquid crystal alignment layer formed over the pixel array. The pixel array includes a display area associated with a first set of pixels and a border area at least partially surrounding the display area. The first set of pixels is configured to be driven to display images for viewing by an audience, the liquid crystal alignment layer defines a first liquid crystal alignment direction over the display area, and the liquid crystal alignment layer defines a second liquid crystal alignment direction over at least a portion of the border area, where the first and second liquid crystal alignment directions are different. For example, the second liquid crystal alignment direction can be selected to promote ion migration away from the display area.

Optionally, the liquid crystal alignment layer can define a plurality of liquid crystal alignment directions over the border area, where each of the plurality of liquid crystal alignment directions is different than the first liquid crystal alignment direction. For example, in one more particular embodiments, the liquid crystal alignment layer can define the second liquid crystal alignment direction over a bottom region of the border area located below the display area, a third liquid crystal alignment direction over a top region of the border area located above the display area, a fourth liquid crystal alignment direction over a right region of the border area located to the right of the display area, and a fifth liquid crystal alignment direction over a left region of the border area located to the left of the display area.

The display device can also include a transparent substrate, a second liquid crystal alignment layer formed over the transparent substrate, and a liquid crystal layer disposed between the liquid crystal alignment layer and the second liquid crystal alignment layer. The second liquid crystal alignment layer can define a third liquid crystal alignment direction over the display area and a fourth liquid crystal alignment direction over at least a portion of the border area. The second liquid crystal alignment direction and the fourth liquid crystal alignment direction can be selected to promote the migration of ions in the liquid crystal layer away from the display area.

Various other particular embodiments are also disclosed. For example, the pixel array can include an ion reservoir area at least partially surrounding the border area. As another example, the liquid crystal alignment layer can comprise a material capable of being photo-aligned. In still another embodiment, the liquid crystal alignment layer can comprise nano structures. The border area can also be associated with a second set of pixels of the pixel array, and the second set of pixels can be configured to be driven with display protections images that promote ion migration away from the display area.

Another method for manufacturing a liquid crystal display of the invention is also disclosed. The method includes the steps of providing a substrate (e.g., a silicon substrate having a pixel array formed thereon, a transparent substrate, etc.) and forming a liquid crystal alignment layer over the substrate. In this method, the liquid crystal alignment layer defines a first liquid crystal alignment direction associated with a display area of the substrate, where the display area is configured for displaying images intended to be viewed by an audience. Additionally, the liquid crystal alignment layer defines a second liquid crystal alignment direction associated with at least a portion of a border area of the substrate, where the border area at least partially surrounds the display area, and the second liquid crystal alignment direction is different than the first liquid crystal alignment direction. Optionally, a particular method further includes the step of forming an ion reservoir area at least partially surrounding the border area.

In one particular method, the step of forming the liquid crystal alignment layer comprises forming the liquid crystal alignment layer from a photo-alignable material. For example, the step of forming the liquid crystal alignment layer can comprise exposing at least one of the display area and the border area to light having a first polarization direction. More particularly, the method can further include masking one of the display area and the border area, and exposing an un-masked portion of the liquid crystal alignment layer to light having a second polarization direction different than the first polarization direction.

Alternatively, the step of forming the liquid crystal alignment layer can include applying liquid crystal alignment layer material over the substrate and applying a pattern of nano-structures on the liquid crystal alignment layer, where the pattern defines the first liquid crystal alignment direction and the second liquid crystal alignment direction.

In another particular method, the step of forming the liquid crystal alignment layer includes forming the liquid crystal alignment layer with a plurality of liquid crystal alignment directions over the border area, where each of the plurality of alignment directions over the border area is different than the first alignment direction. For example, the liquid crystal alignment layer can be manufactured to define the second liquid crystal alignment direction over a bottom region of the border area located below the display area, a third liquid crystal alignment direction over a top region of the border area located above the display area, a fourth liquid crystal alignment direction over a right region of the border area located to the right of the display area, and a fifth liquid crystal alignment direction over a left region of the border area located to the left of the display area. The plurality of liquid crystal alignment directions over the border area can be selected to promote ion migration away from the display area.

Thus, the invention provides LCD devices having one or more means for controlling ion migration within the liquid crystal layer away from the display area (e.g., displaying display protection images, ion retention area(s), different sizes of pixels in the border and display areas, liquid crystal alignment director(s) that direct ions away from the display area, etc.) and methods of manufacturing such LCD devices.

BRIEF DESCRIPTION OF THE DRAWINGS

The present invention is described with reference to the following drawings, wherein like reference numbers denote substantially similar elements:

FIG. 11E shows a fifth step of a method of manufacturing the LCD device of FIG. 9;

FIG. 11F shows a sixth step of a method of manufacturing the LCD device of FIG. 9;

DETAILED DESCRIPTION

The present invention overcomes the problems associated with the prior art, by providing a display driver and display that facilitates controlling ion migration in the liquid crystal layer and promotes ion migration away from the display area of a pixel array. In the following description, numerous specific details are set forth (e.g., specific driving patterns, pixel layouts, shapes, etc.) in order to provide a thorough understanding of the invention. Those skilled in the art will recognize, however, that the invention may be practiced apart from these specific details. In other instances, details of well-known liquid crystal displays and display driving practices and components (e.g., pixel circuitry layouts, wafer processing techniques, data processing, routine optimization, etc.) have been omitted, so as not to unnecessarily obscure the present invention.

Figure 1:
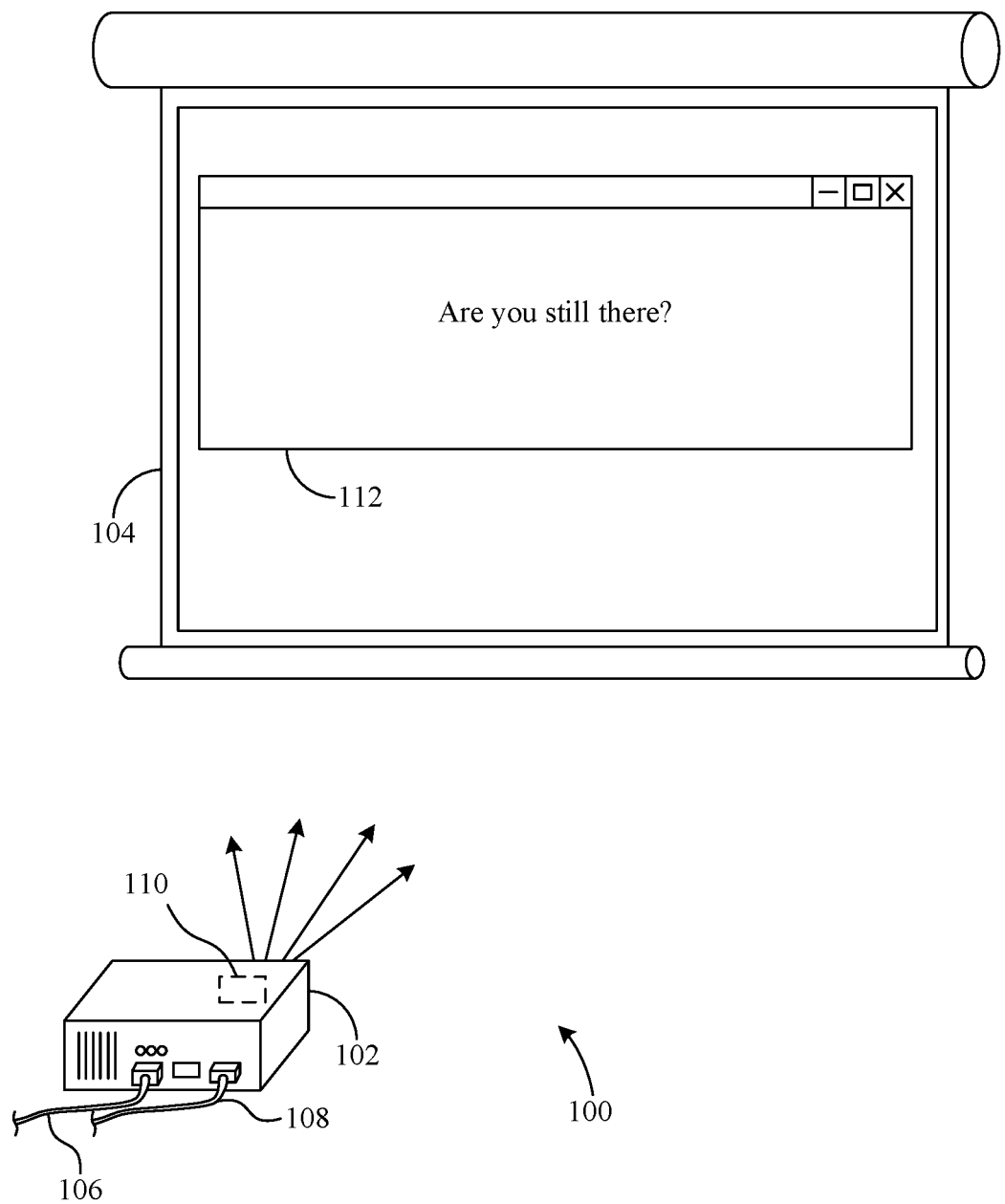
FIG. 1 is a perspective view of an exemplary projector system incorporating a liquid crystal display (LCD) device and driver according to the present invention.

FIG. 1 shows a projector system 100, including a projector 102 and a screen 104. Projector 102 is connected to a power source (not shown) via a power cable 106, and to a data source (e.g., a laptop computer, etc., not shown) via a data link 108. In this example, data link 108 is a cable connection, but could alternatively be a wireless connection. Projector 102 also includes a liquid crystal display (LCD) device 110 and associated display driving circuitry (FIG. 2) that generate the images 112 projected on screen 104. In this example, LCD device 110 comprises a reflective liquid crystal on silicon (LCOS) device as will be discussed in more detail below.

Projector 102 receives image data via data link 108 and projects images encoded in the data onto screen 104. In this example embodiment, data link 108 receives image data from a computer (not shown), while projector system 100 acts as a monitor. Because the computer has been idle for a significant amount of time, a pop-up window 112 is displayed on screen 104, questioning whether the computer is still in use.

While the invention will be described with respect to a nematic LCOS LCD device 110, the invention is equally applicable and beneficial to other types of liquid crystal displays, such as ferroelectric LCOS and transmissive LCD displays. Furthermore, in addition to projector 102, the invention can be utilized in all types of devices incorporating an LCD device, such as laptop computers, televisions, monitors, mobile phones, etc.

Figure 2A:
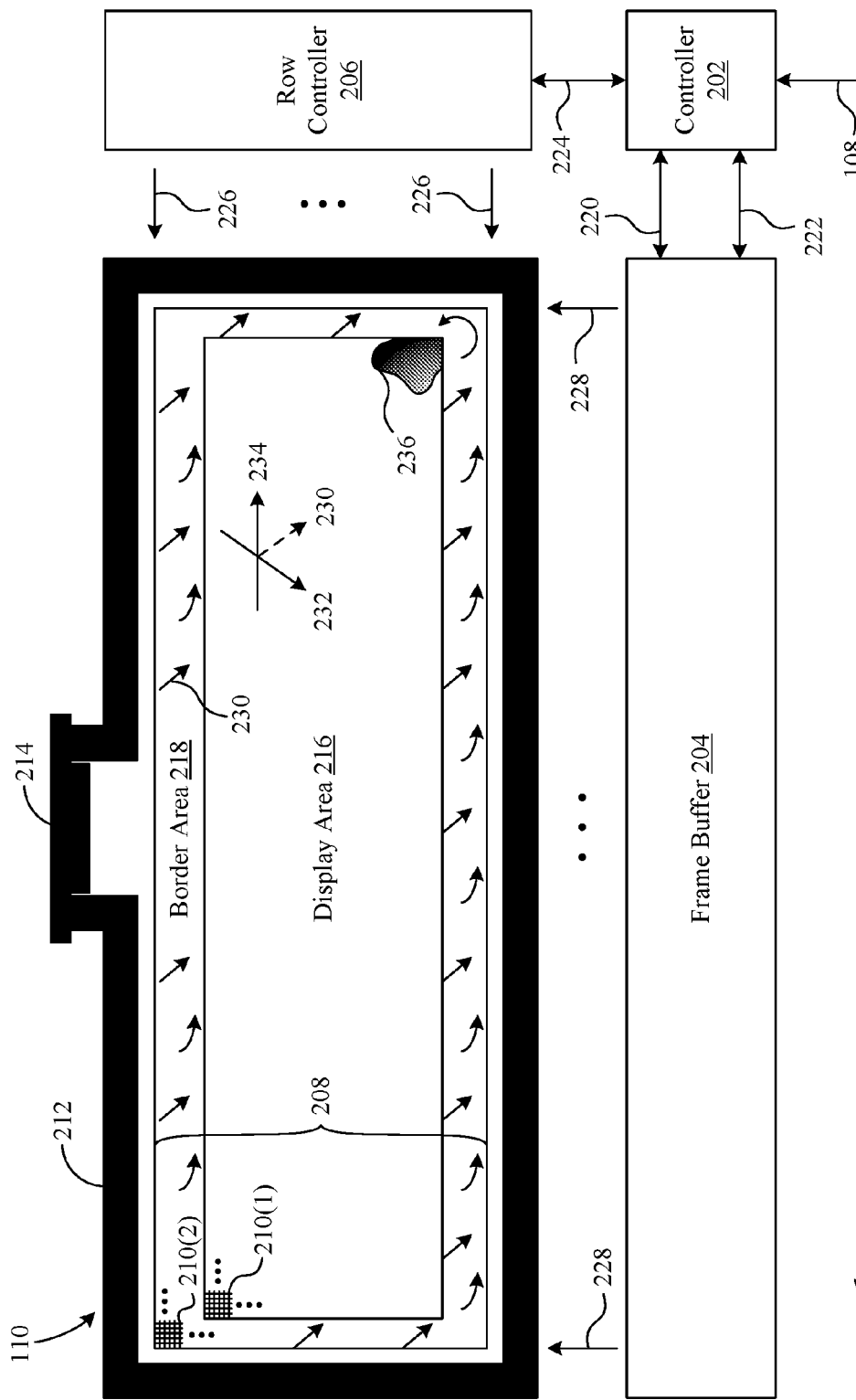
FIG. 2A is a block diagram illustrating how ion migration can stress an LCD device and lead to defects in the projector of FIG. 1.

FIG. 2A is a block diagram showing projector 102 and LCD device 110 in greater detail. In addition to LCD device 110, projector 102 includes a controller 202, a frame buffer 204, and a row controller 206. Furthermore, LCD device 110 is shown to include a pixel array 208 including a plurality of pixels 210 arranged in rows and columns. A transparent common electrode (FIG. 7) overlies pixel array 208 and, in a particular embodiment, comprises a layer of indium tin oxide (ITO). LCD device 110 also includes a liquid crystal layer (FIG. 7) that is disposed between pixel array 208 and the common electrode and that is contained by a gasket seal 212 surrounding the pixel array 208 and a plug 214.

Controller 202 controls and coordinates the transfer of data to pixels 210 of pixel array 208. In doing so, controller 202 defines a display area 216 and a border area 218 of pixel array 208. Display area 216 includes a first set of pixels 210(1), and controller 202 drives the first set of pixels 210(1) such that display area 208 displays images that are encoded in image data and intended for viewing by an audience.

Controller 202 also defines a border area 218 that at least partially surrounds display area 216 and includes a second set of pixels 210(2). Controller 202 can drive the second set of pixels 210(2) of border area 218 in a dark state such that border area 218 defines a distinct dark border surrounding display area 216. (Note: border area 218 is shown white in the drawing so as not to obscure the arrows that are shown.) In this manner, controller 202 can adjust the sizes of the display area 216 and border area 218 as desired based on the image data received on data link 108 and other device settings (e.g., selected resolution, etc.). Accordingly, only a portion of the pixels 210 in pixel array 208 will be used to define display area 216.

In display 110, a pixel 210 is made to appear dark (black) by asserting a predetermined non-zero voltage across the liquid crystal layer over that pixel, whereas a pixel 210 is made to appear bright (white) by asserting no voltage across the liquid crystal layer. Thus, for the border area 218 to appear dark, controller 202 drives the second set of pixels 210(2) at some voltage bias across the liquid crystal layer.

In this example, controller 202 drives pixel array 208 by receiving image data via data link 108 and then augments the image data by inserting additional data bits for driving each of the second set of pixels 210(2) of border area 218 in a dark state. Controller 202 transfers the augmented image data into frame buffer 204, which has the capacity to store one or more frames of augmented image data for the entire pixel array 208, via one or more data lines 220. Controller 202 also asserts control signals (e.g., read, write, etc.) on frame buffer 204 by one or more control lines 222 to cause data to be transferred into and out of frame buffer 204. Once an entire frame of augmented image data has been transferred into frame buffer 204, controller 202 utilizes one or more control lines 224 to instruct row controller 206 to assert a row select signal onto a first of row of pixels 210 of pixel array 208 via a first one of row select lines 226. Next, controller 202 instructs frame buffer 204 to assert a first row of augmented image data onto the first row of pixels 210 via data lines 228. This process is repeated for each successive row until an entire frame of augmented image data has been asserted onto pixel array 208. A light source (not shown) shines light onto pixel array 208 such that the light is spatially modulated based on the values asserted onto each pixel 210 of pixel array 208 and an image is displayed on screen 104 comprising both the image asserted on the pixels 210(1) of display area 216 and the dark border asserted on the pixels 210(2) of border area 218.

The inventors have discovered that driving pixels 210 of pixel array 208 in certain ways affects the migration of ions in the liquid crystal layer of pixel array 208. For example, the inventors have found that driving the second set of pixels 210(2) in a continuous dark state causes significant display stress and image degradation. Specifically, driving the pixels 210(2) of border area 218 at non-zero voltage(s) so that the pixels 210(2) are in a continuous dark state causes ions to migrate through the liquid crystal layer and to accumulate in one or more corner(s) of the pixels array 208. Generally, the direction of ion migration 230 follows the bisector of the angle formed between the liquid crystal alignment directors (rub directions) 232 and 234 defined by liquid crystal alignment layers formed over the silicon substrate and transparent substrate, respectively, of the LCD device.

For LCD device 110, given the orientation of the directors 232 and 234 shown, the ions will migrate around display area 216 and accumulate in the bottom-right corner of pixel array 208. From there, the ions will back-diffuse into display area 216 and cause one or more permanent defect(s) 236 (e.g., permanent black, flare, bleeding effect, image-sticking, etc.), thereby ruining display 110. Continuously driving border area 218 to a dark state also causes the ions to migrate rather quickly, with permanent defects 236 appearing in as little as several hundred hours of use in some trials. The rate of ion migration can also be affected by other properties of the liquid crystal, such as its viscosity.

In addition to the above, inventors have discovered that driving the pixels 210 using different frequencies and/or voltage amplitudes can change the speed and direction at which ions move through the liquid crystal layer. Thus, the ion migration in the border area 218 can be controlled by asserting different display protection images on the pixels 210(2) of border area 218 to prevent ions from accumulating in a region of the pixel array 208 and causing damage to the LCD device 110.

Figure 2B:
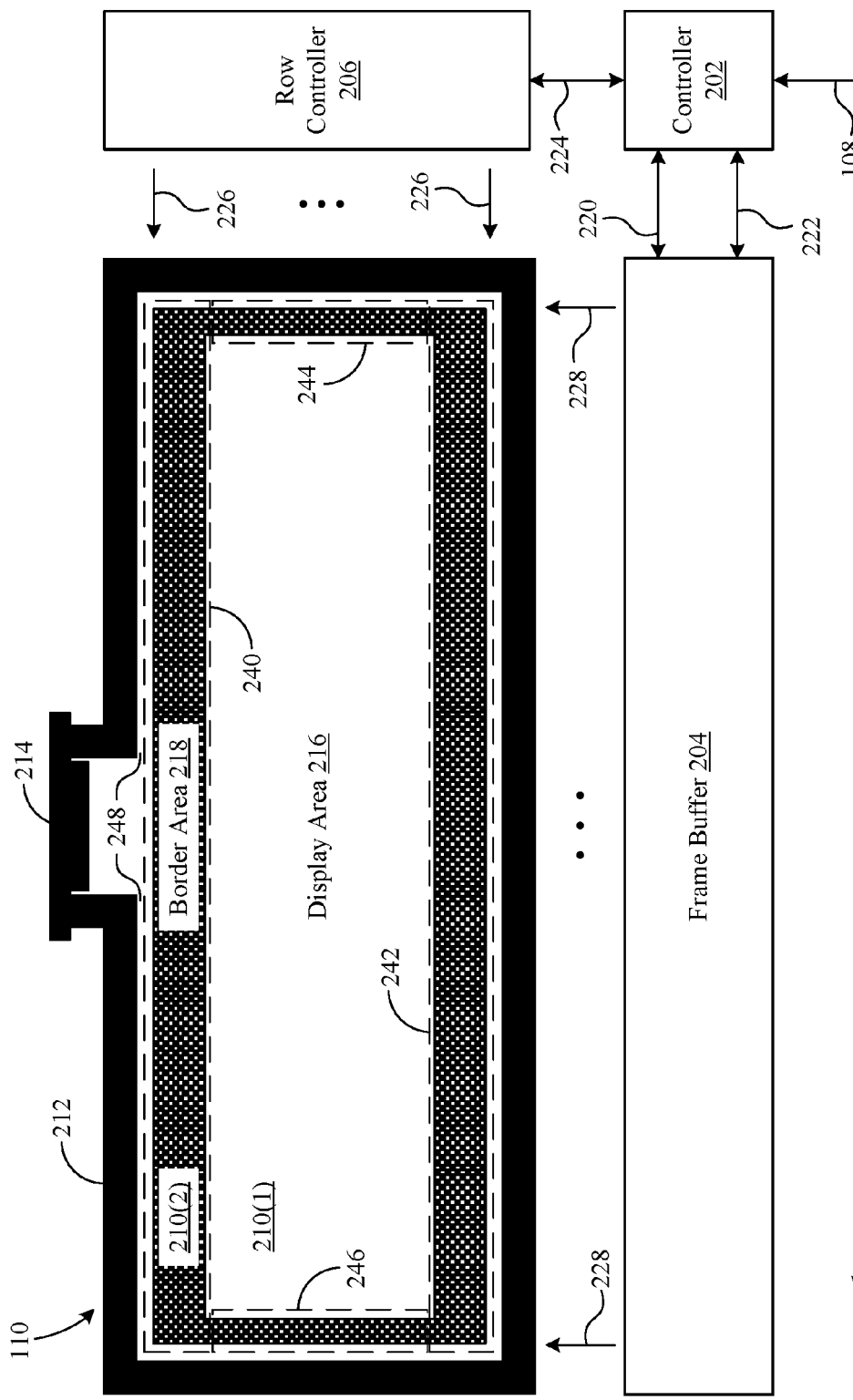
FIG. 2B is a block diagram illustrating the LCD device of FIG. 1 displaying a display-protection image according to one embodiment of the present invention.

FIG. 2B shows projector 102 where controller 202 is configured to assert a series of display-protection images (e.g., checkerboard pattern(s), etc.) on the pixels 210(2) of border area 218. Additionally, controller 202 can be configured to divide border area 218 into an upper region 240, a lower region 242, a right region 244 and a left region 246. Each of regions 240, 242, 244, and 246 can be driven by different display protection images to uniquely affect and control ion migration within those regions and direct ions away from display area 216. Additionally, border area 218 is shown to be surrounded by an ion-retention region 248 (the white space between border area 218 and gasket 212), where migrating ions can be accumulated without damaging pixel array 208 as will be discussed further below.

As above, controller 202 coordinates the transfer of image data to pixel array 208. Controller 202 receives image data via data link 108 and creates augmented image data by inserting additional data bits for driving the pixels of border area 218. In this embodiment, however, controller 202 creates augmented image data by inserting data bits to drive the pixels 210(2) of border area 218 with a display protection image (e.g., a particular checkerboard pattern, etc.) that controls ion migration and prevents damaging ion accumulation in the corner(s) of LCD device 110. The augmented image data can then be stored in frame buffer 204 and written to pixel array 208 using row controller 206 as discussed above.

Because the display protection image displayed on border area 218 will likely contain both light (white) and dark (black) pixels that could be distracting to a viewer, it may not be desirable to project the display protection image asserted on border area 218 onto screen 104. Accordingly, border area 218 may be masked (e.g., by an opaque layer on LCD device 110, a masking device in projector 102, etc.) to prevent light from reach the pixels 210(2). In another embodiment, a light source (not shown) of projector 102 can be controlled so as not to illuminate the border area 218. In still other embodiments, such as those where the display-protection images are unlikely to be distracting to a viewer, the border area 218 can be illuminated along with display area 216 and the display protection image displayed.

Figure 3:
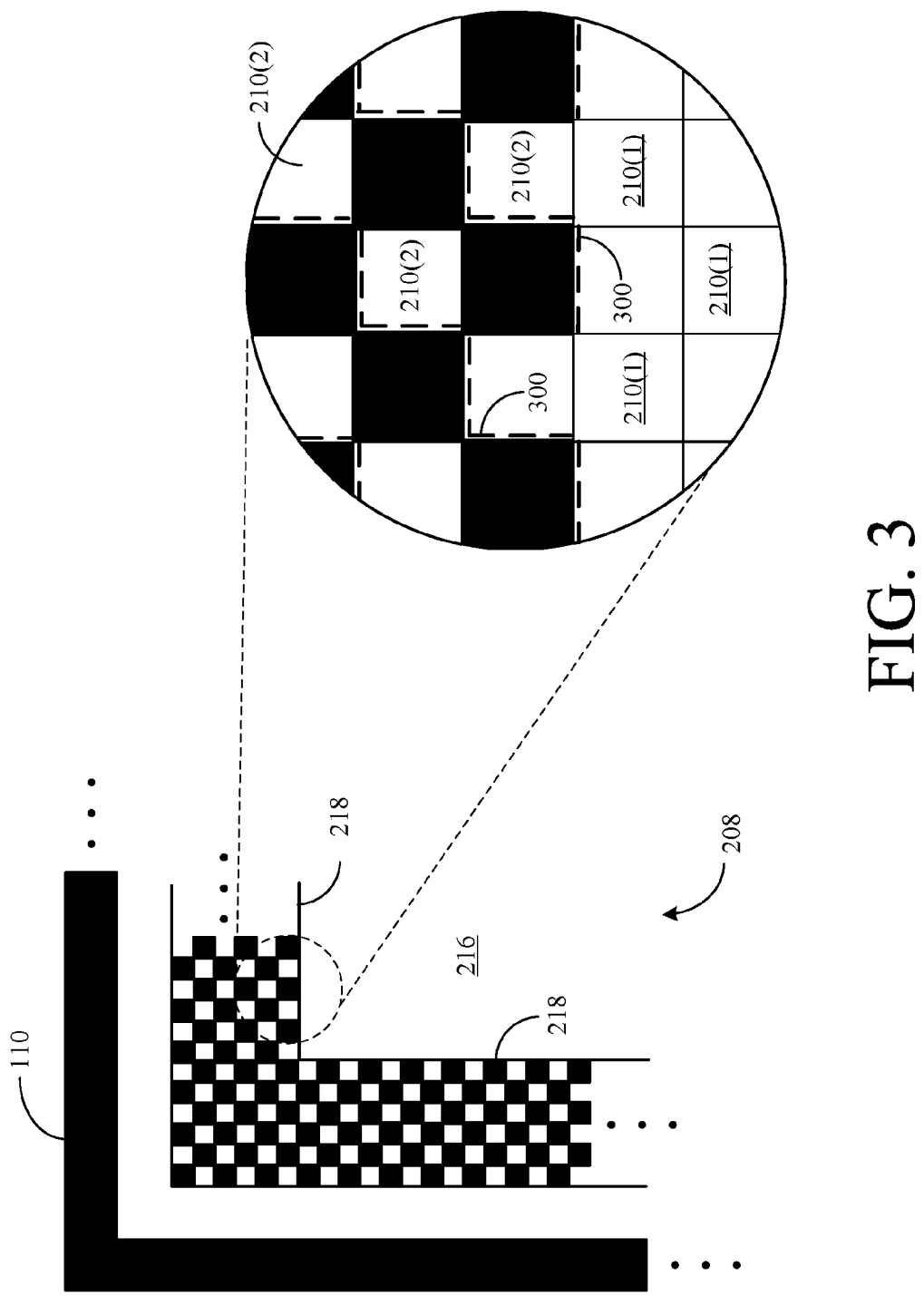
FIG. 3 is a magnified view of a portion of the LCD device of FIG. 2B.

FIG. 3 shows a portion of pixel array 208, including portions of display area 216 and border area 218. A magnified region of interest is also shown which shows some pixels 210(2) of border area 218 meeting some pixels 210(1) of display area 216. In this embodiment, an "off" signal (e.g., zero volts, ground, a voltage equal to the voltage asserted on the transparent common electrode, etc.) that is asserted on either a pixel 210(1) or 210(2) results in no voltage being asserted across the pixel 210 and causes a light (white) pixel (in this example, the absence of an electric field allows the liquid crystal layer to rotate the polarization of the light on its round trip through the panel so that it is not blocked by an analyzer). Conversely, an "on" signal asserted on either a pixel 210(1) or 210(2) causes a non-zero voltage (e.g., 5V, etc.) to be applied across the pixel 210 and results in a dark (black) pixel (i.e., in the presence of a non-zero electric field, the liquid crystal layer does not alter the polarization of reflected light from the pixel 210 and it is blocked from display on screen 104 by the analyzer).

For simplicity, in this example, all of the pixels 210(1) of display area 216 are driven with an off-signal (e.g., ground, 0V) signal, resulting in white pixels. In contrast, pixels 210(2) of border area 218 are driven with a display protection image corresponding to a checkerboard pattern of "on" and "off" signals, which results in a checkerboard of white and black pixels. Of course, display area 216 would normally be displaying an image that includes both bright and dark pixels.

The magnified portion of FIG. 3 shows a plurality of barriers 300 that are formed when the pixels 210(2) of border area 210 are driven in the checkerboard pattern. Barriers 300 form between on and off pixels, because the off (white) pixels do not have an electric field asserted thereon. The lack of electric field across the off pixels prevents ion migration. More specifically, ions that enter an off pixel will move only due to diffusion, because there is not an electric field applied to the off pixel to reorient the liquid crystal material and drive ion motion in the direction 230. Diffusion is a far slower mode of ion migration, and so the off pixels will act as reservoirs and prevent ions from quickly migrating to and accumulating in the corners of the pixel array 208 where they would otherwise create defects 236. In other words, the off pixels create migration barriers 300 at their pixel boundaries, which stop the active transport of ions encroaching from the dark pixels. In FIG. 3, the barriers 300 are shown based on the direction of ion migration 230, because the barriers 300 inhibit ions moving from dark pixels laterally rightward or downward.

Figure 4A:
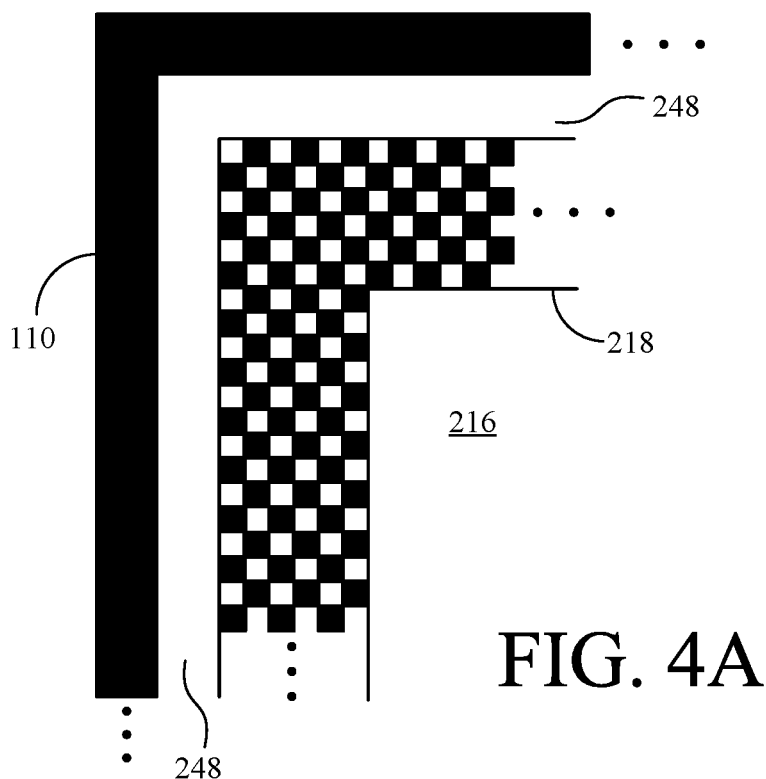
FIG. 4A is a top view showing a portion of the LCD device of FIG. 2B displaying a first display protection image during a first time period.
Figure 4B:
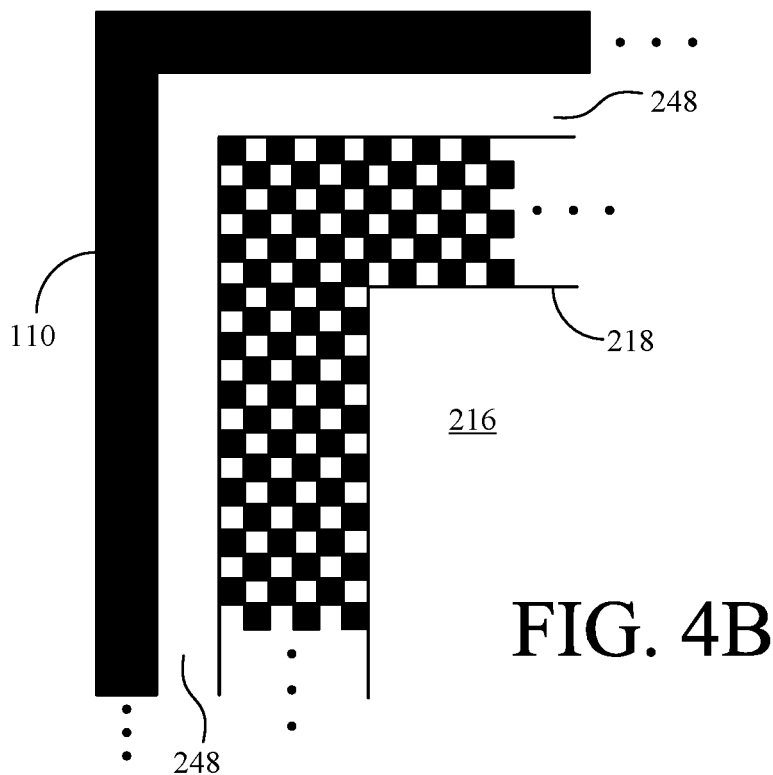
FIG. 4B is a top view showing a portion of the LCD device of FIG. 2B displaying a second display protection image during a second time period.

FIGS. 4A and 4B show a portion of LCD device 110 during sequential time periods (e.g., during consecutive frames of augmented image data, during consecutive bits of augmented image data, etc.). In FIG. 4A, border area 218 is driven in a checkerboard pattern of "on" and "off" signals during a first time period. Then in FIG. 4B, border area 218 is driven in an inverted checkerboard pattern during a second time interval, where pixels 210(2) previously driven with an on signal are driven with an off signal and pixels 210(2) previously driven with an on signal are driven with an off signal. While LCD device 110 is in operation, border area 218 is driven in this alternating fashion, continually switching between the two patterns shown in FIGS. 4A and 4B during consecutive time periods. Driving border area 218 with alternating checkerboard patterns also minimizes image sticking of the checkerboard pattern in the border area 218 that might otherwise be caused by the checkerboard pattern itself.

As mentioned above, the inventors have discovered that driving pixels 210(2) at different frequencies and voltage amplitudes can change the directions that the ions move in the liquid crystal layer. By periodically changing the white pixels to black, and vice versa, and driving the checkerboard and its inverse with conditions to cause the ions to move in opposite directions, the ions can be contained outside of the display area 216. Accordingly, the invention controls ion migration (both direction and speed) so that ions do not accumulate in corners of pixel array 208 and cause defects 236 in display area 216. This increases the lifetime of the LCD device 110. Furthermore, as an indirect benefit, the invention can reduce some of the need for displaying a screen saver on display area 216.

Figure 5:
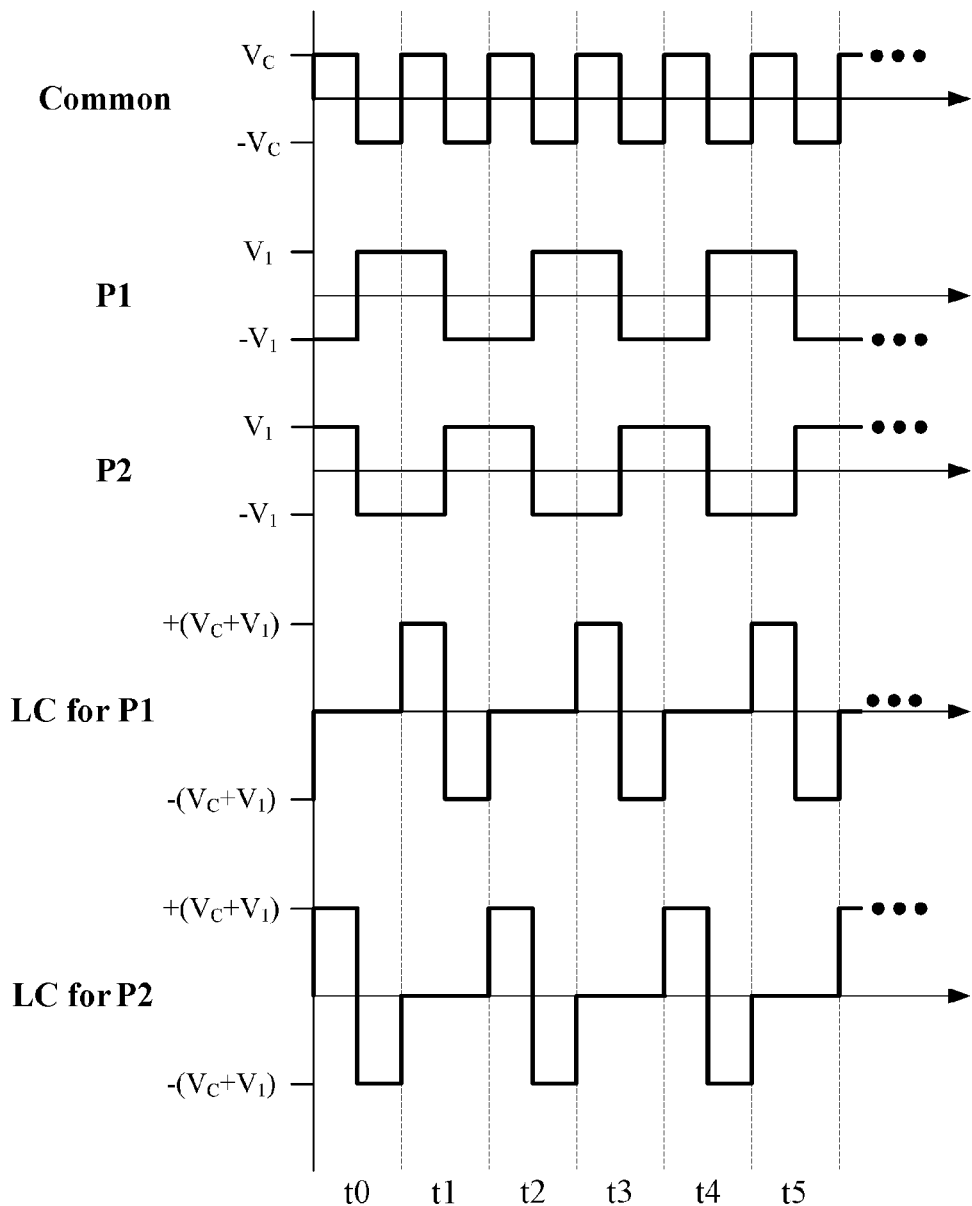
FIG. 5 is an exemplary timing diagram illustrating how a series of display protection images can be asserted on the LCD device of FIG. 2B.

FIG. 5 shows a plurality of diagrams illustrating a driving scheme used to assert a series of display protection images (alternating checkerboard patterns) on border area 218 of pixel array 208. A diagram labeled "Common" illustrates a voltage waveform applied to the common electrode (e.g., a layer of ITO, etc.) overlying display area 216 and border area 218. A diagram labeled "P1" illustrates a voltage waveform applied to all the pixels 210(2) in an odd row and an odd column and to all pixels 210(2) in an even row and an even column of border area 218. A diagram labeled "P2" illustrates a voltage waveform applied to all the pixels 210(2) in an odd row and an even column and to all pixels 210(2) in an even row and an odd column of border area 218. A diagram labeled "LC for P1" illustrates the voltage potential applied across the liquid crystal layer for all pixels P1 in border area 218, whereas a diagram labeled "LC for P2" illustrates the voltage potential applied across the liquid crystal layer for all pixels P1 in border area 218.

In FIG. 5, the x-axes show time, and the y-axis shows voltage amplitude. The x-axes are subdivided into time intervals, labeled t0-t5, which correspond to any useful time interval (e.g., a frame time, an assertion time for a particular plane of data bits, the combined assertion times for multiple planes of data bits, etc.). As is known in the art, nematic liquid crystal molecules change their orientation based on the magnitude of the electric field applied across the liquid crystal layer, not its sign. Additionally, residual DC bias between pixels and the common electrode can degrade image quality. Therefore, the voltages applied to the common electrode, pixels P1, and pixels P2 switch polarity during each time interval to implement liquid crystal debiasing, which results in a net DC bias of 0 volts across the liquid crystal layer between the pixels 910 and the transparent electrode during each time interval.

Additionally, to implement the alternating checkerboard pattern discussed above, a voltage alternating between Vc and −Vc is applied to the common electrode over time. Similarly, a voltage alternating between V1 and −V1 is applied to pixels P1 and to pixels P2, although the waveform applied to each of the pixels P2 is one time interval out of phase with the waveform applied to each of pixels P1. In this example, Vc=V1 and −Vc=−V1, but other voltage schemes are possible.

The waveform "LC for P1" corresponds to the voltage across the liquid crystal layer between the common electrode and each pixel P1. As shown, during each of even time intervals t0, t2, t4, etc., the voltage across the liquid crystal layer over each pixel P1 is zero volts, because the voltage waveforms for the common electrode and pixels P1 are out of phase. However, during the odd time intervals t1, t3, t5, etc., the voltage across the liquid crystal layer over each pixel P1 alternates between +(Vc+V1) and −(Vc+V1), because the voltage waveforms for the common electrode and pixels P1 are in phase. This results in the pixels P1 appearing bright (white) during even time intervals t0, t2, t4, etc. and dark (black) during odd time intervals t1, t3, t5, etc.

The waveform "LC for P2" corresponds to the voltage difference across the liquid crystal layer between the common electrode and each pixel P2. As shown, during each of even time intervals t0, t2, t4, etc., the voltage across the liquid crystal over each pixel P2 alternates between +(Vc+V1) and −(Vc+V1), because the voltage waveforms for the common electrode and the pixels P2 are in phase. However, during each of odd time intervals t1, t3, t5, etc., the voltage across the liquid crystal layer over each pixel P2 is zero volts, because the voltage waveforms for the common electrode and pixels P2 are out of phase. This results in the pixels P2 appearing dark (black) during even time intervals t0, t2, t4, etc. and bright (white) during odd time intervals t1, t3, t5, etc.

In summary, during a first time interval t0 (corresponding to FIG. 4A), pixels P1 are driven in an off (white) state and pixels P2 are driven in an on (black) state. Then, during a second time interval t1 (corresponding to FIG. 4B), pixels P1 are driven in an on (black) state and pixels P2 are driven in an off (white) state. In a third time interval, t2 (corresponding again to FIG. 4A), pixels P1 are again driven in an off state and pixels P2 are again driven in an on state. This pattern continues for as long as pixel array 208 is in use. As mentioned above, pixels P1 and pixels P2 can be driven with different driving characteristics to cause, for example, the ions to migrate in opposite directions. In such an embodiment, the alternating fields cause the ions to move back and forth in a small area.

Furthermore, in some embodiments, the pixels 210(2) can be driven with different voltage and/or frequency characteristics to cause other desired movements of ions in the border area 218. As an example, the display protection images asserted on each of the regions 240, 242, 244, and 246 (FIG. 2B) can be different. Pixels 210(2) in region 240 can be driven to direct ions upward and away from display area 216, whereas pixels 210(2) in region 242 can be driven to direct ions downward and away from display area 216. Similarly, pixels 210(2) in region 244 can be driven to direct ions rightward and away from display area 216, and pixels 210(2) in region 246 can be driven to direct ions leftward and away from display area 216.

The pixels 210(2) can also be driven to cause ions to migrate to the ion-retention region 248 (FIGS. 2, 4A-4B) surrounding border area 218 and away from display area 216. Ion-retention region 248 is a portion of pixel array 208 maintained at a constant zero voltage bias across the liquid crystal layer. Because no voltage bias is present in ion-retention region 248, ions can be pushed into and held in the ion-retention region 248 by the surrounding display-protection images applied to boundary area 218. In a particular embodiment, ion-retention area 248 includes pixel electrodes, which are driven at the same voltages as the common electrode (to create the zero voltage bias), but otherwise have no driving circuitry (e.g., no data latch circuitry, etc.). In other embodiments, driving electronics can be added to the ion-retention region 248, allowing for an expanded border area 218, an expanded display area 216, or both.

The exact driving scheme for border area 218 will depend on the specific configuration and design of LCD device 110. As mentioned above, the direction of ion migration depends on the directions of the LC alignment directors for the top and bottom substrates of the LCD device. Additionally, the exact effect of the various driving schemes can also depend on the composition of the liquid crystal layer (e.g., the size and/or shape of the molecules, charge profile of the ions produced, etc.). Thus, useful frequencies and voltages for driving pixels in various regions of border area 218 can be determined for specific applications based on various factors, including, but not limited to, the composition of the liquid crystals, the alignment directions of the pixel array, the ratio of the areas of the active and border areas, etc.

Figure 6:
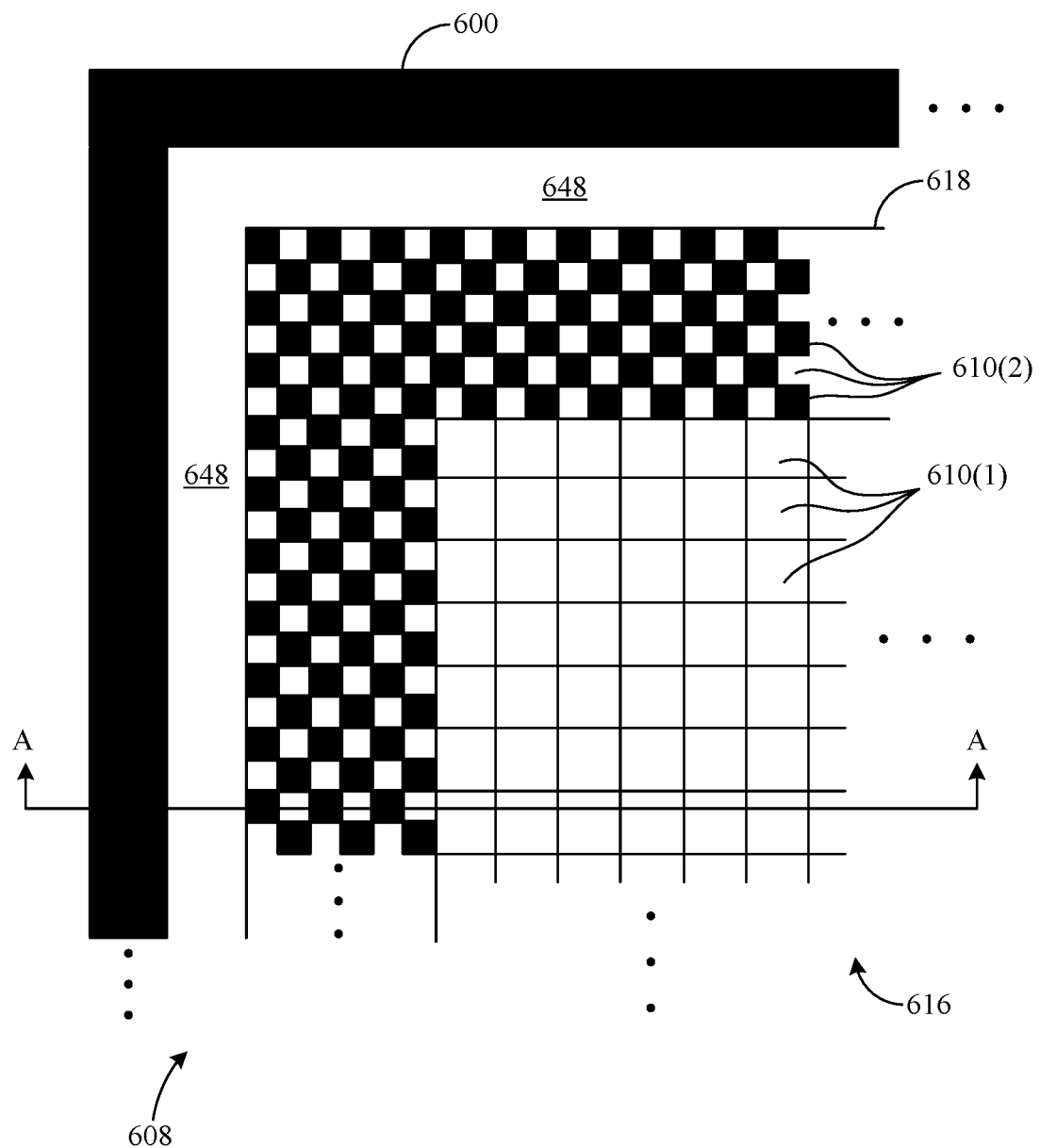
FIG. 6 is a top view of a portion of an LCD device according to an alternative embodiment of the present invention.

FIG. 6 shows a portion of an alternative LCD device 600 having an alternative pixel array 608, which defines a display area 616 and a border area 618. In this embodiment, the pixels 610(2) of border area 618 are driven in the same checkerboard pattern as the pixels 210(2) of border area 218. However, the pixels 610(2) of border area 618 are smaller than the pixels 610(1) of display area 616. In this example, each pixel 610(2) covers one quarter of the area of a pixel 610(1) of display area 604. Because smaller pixels take up a smaller area, more pixels 610(2) will fit into border area 618 than if those pixels were the same size as the pixels 610(1) in display area 616. Therefore, there are more barriers (like barriers 300) to ion migration per unit area in border area 618 than in border area 218, because in prior embodiments, the pixels 210(1) of display area 216 were the same size as the pixels 210(2) of border area 218. The relative size of the pixels of border area 618 and display area 616 can be chosen by a manufacturer for specific applications, based on many factors, such as, but not limited to, the intended lifetime of the display, cost of manufacture, and display resolution.

Figure 7:
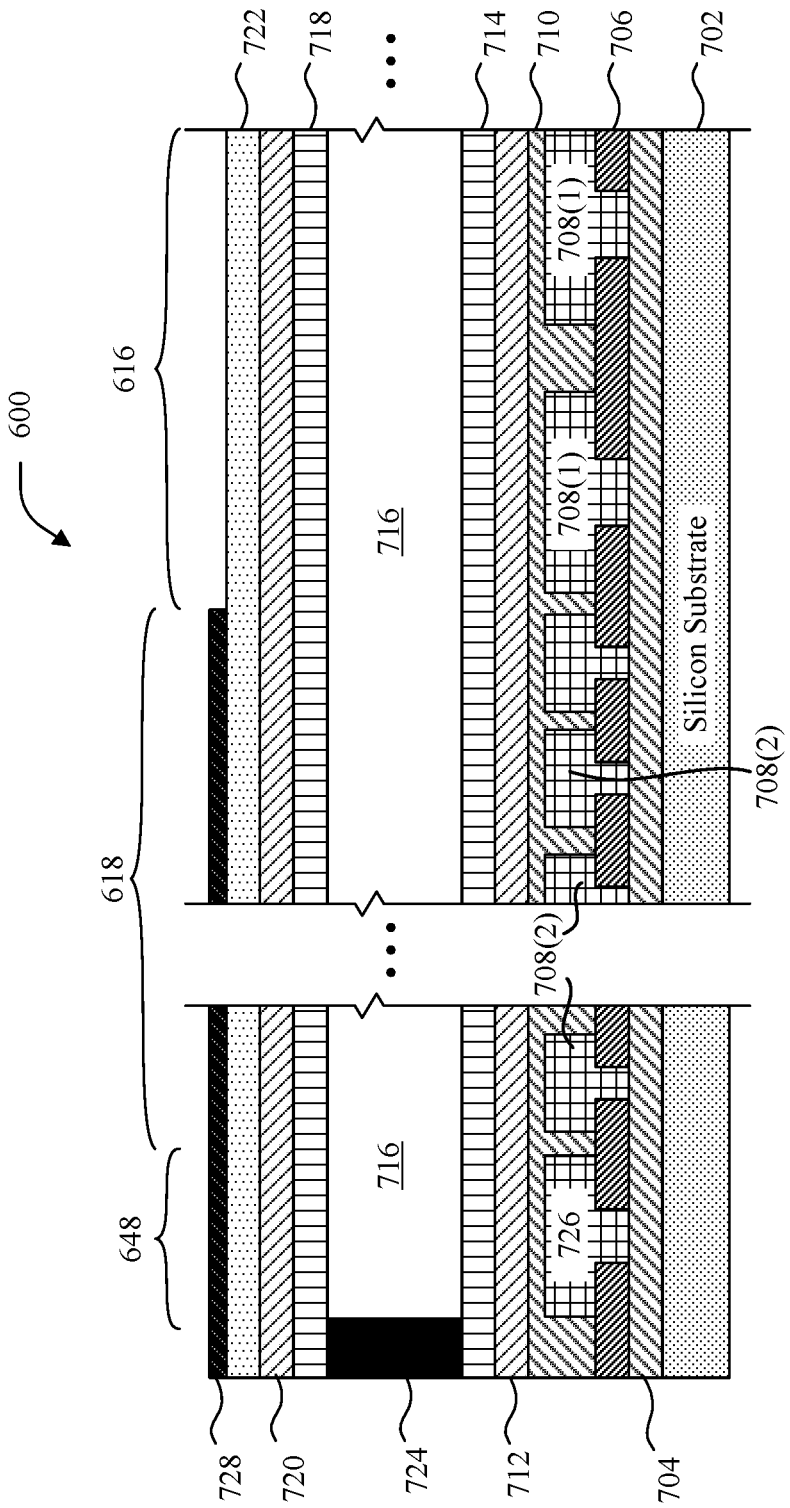
FIG. 7 is a cross-sectional view of a portion of the LCD device of FIG. 6 taken along section line A-A.

FIG. 7 is a cross-sectional view of LCD device 600 taken along section line A-A of FIG. 6. In this embodiment, LCD device 600 is formed on a silicon substrate 702 and includes integrated circuitry 704 formed over substrate 702, an insulating layer 706 formed over integrated circuitry 704, a plurality of large pixel mirrors 708(1) associated with pixels 610(1) of display area 616 and a plurality of small pixel mirrors 708(2) associated with the pixels 610(2) of border area 618 formed over insulating layer 706 and in contact with integrated circuitry 704, a planarized layer 710 formed over pixel mirrors 708(1-2), and a protective coating 712 formed over planarized layer 710. A lower liquid crystal alignment layer 714 is also formed above pixel mirrors 708 and includes a liquid crystal director (e.g., director 232 in FIG. 2A), which aligns the liquid crystals of a liquid crystal layer 716. LCD device 600 also includes an upper liquid crystal alignment layer 718, which defines another liquid crystal director (e.g., director 234), formed on a transparent electrode (e.g., indium tin oxide (ITO)) layer 720, which is formed on a transparent (e.g., glass) substrate 722. A gasket 724 surrounds and contains liquid crystal layer 716.

LCD device 600 also includes one or more electrodes 726 implementing the ion-retention region 648 around border area 618. Electrodes 726 are retained at the same potential as ITO layer 720 so as to define an ion retention region 648 as described above. In some embodiments, electrodes 726 do not otherwise include pixel driving integrated circuitry. Additionally, an optional opaque mask 728 (e.g., a layer of opaque material, etc.) can be formed over the pixel mirrors 708(2) of border area 618 and optionally over ion-retention region 648 to block the display protection images asserted on border area 618 and any reflections from electrodes 726 from being displayed.

Small pixels 610(2) and ion retention region 648 each define ion-migration control features (impediments) and protect display 600. Small pixels 618(2) provide more off-state barriers to ion migration when the driven with inverted checkerboard patterns as discussed previously. Additionally, voltage amplitudes and/or assertion frequencies can be controlled to push ions to ion-retention region(s) 648 where the ions are retained away from display area 616.

Finally, it should be note that the elements of FIG. 7 are representational only and may not be drawn to scale.

Figure 8:
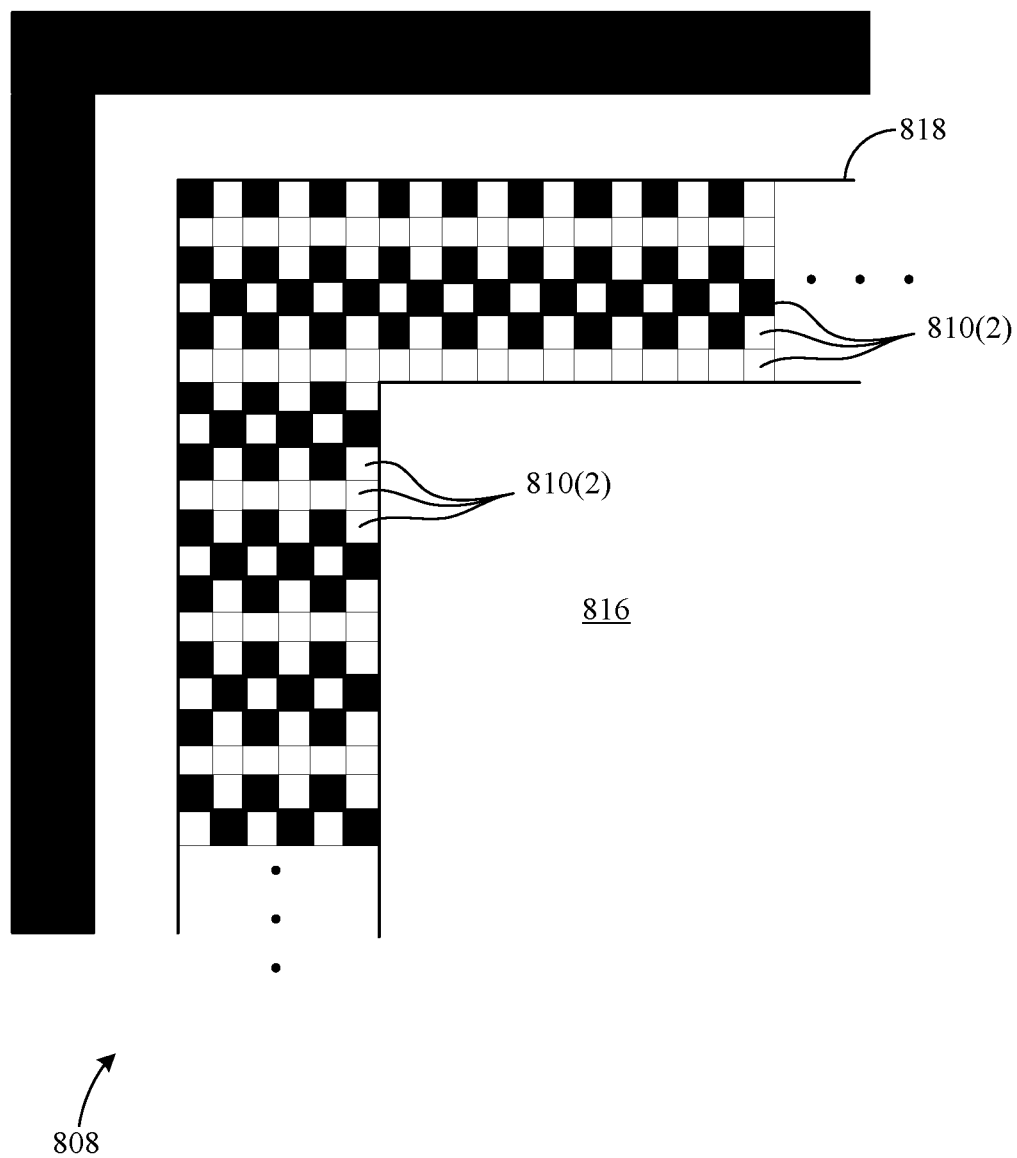
FIG. 8 is a top view of a portion of a pixel array driven with another exemplary display protection image according to the invention.

FIG. 8 shows another driving scheme for a pixel array 808 according to the present invention. Pixel array 808 defines a display area 816 and a border area 818. The inventors have discovered that varying the spatial driving pattern of the pixels 810(2) of border area 818 can increase the effectiveness of border area 818 at controlling ion migration. For example, the pixels 810(2) of border area 818 are driven in a checkerboard pattern with intermittent rows of "off" (white) pixels 810(2). These rows of "off" pixels create a significant barrier to ion migration, which can increase the effective life of pixel array 700 even further. A manufacturer can choose a pattern of "off" pixels 810(2) that creates barriers to most effectively manage ion migration for its desired application.

Figure 9:
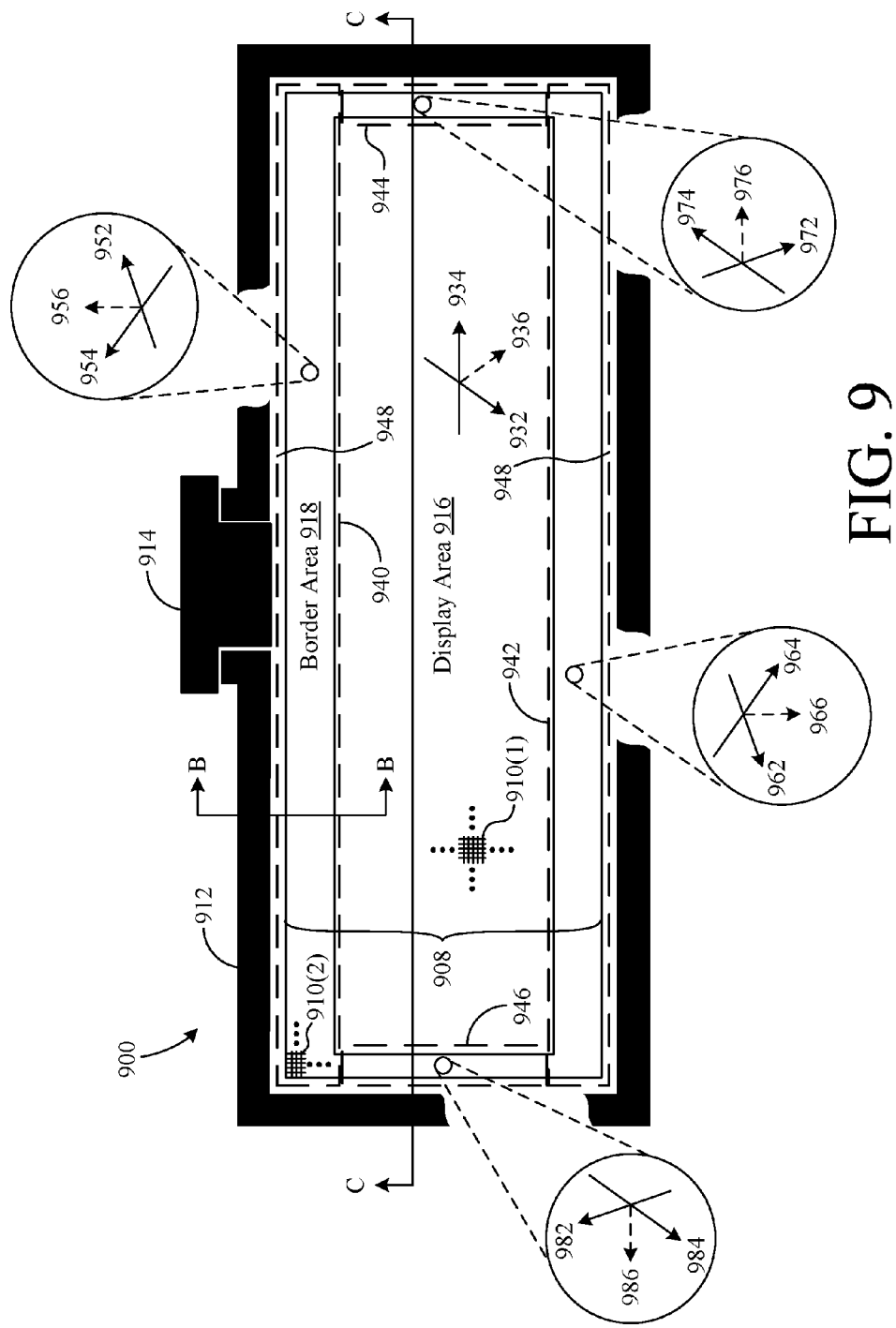
FIG. 9 is a block diagram of a LCD device having a plurality of liquid crystal alignment directions according to an embodiment of the present invention.

FIG. 9 shows another LCD device 900 of the present invention. Like LCD device 110, LCD device 900 includes a pixel array 908 having a plurality of pixels 910 arranged in a plurality of rows and a plurality of columns. Pixel array 908 includes a first set of pixels 910(1), defining a display area 916, and a second set of pixels 910(2) defining a border area 918. The pixels 910(1) of display area 916 are configured to display images intended for viewing by an audience, whereas the pixels 910(2) of border area 918 are configured for asserting display protection images for controlling ion migration within border area 918. LCD device 900 also includes a liquid crystal layer (not shown) that overlies pixel array 908 and is contained by a gasket seal 912 and plug 914.

Like display device 110, LCD device 900 can include elements like controller 202, frame buffer 204, and row controller 206 (FIGS. 2A-2B). However, such elements are omitted from FIG. 9 so as not to obscure the other features of LCD device 900.

The liquid crystals of the liquid crystal layer are aligned in predetermined directions by a plurality of liquid crystal alignment layers (FIG. 10) of LCD device 900. A lower liquid crystal alignment layer is formed over pixel array 908 and defines a liquid crystal alignment direction (director) 932 over display area 916. Similarly, an upper liquid crystal alignment layer is formed over a transparent substrate (FIG. 10) of LCD device 900 and defines a liquid crystal alignment direction (director) 934 over display area 916. As explained above, ion migration within the liquid crystal layer overlying display area 916 will, therefore, be in the direction of the bisector 936 of the angle formed between directors 932 and 934.

Each of the lower and upper liquid crystal alignment layers further defines a plurality of liquid crystal alignment directions over border area 918. Border area 918 includes a plurality of regions, including upper region 940, bottom region 942, right region 944, and left region 946. In upper region 940, the lower alignment layer defines a liquid crystal alignment direction 952 that is different than the alignment direction 932 over display area 916. Similarly, the upper alignment layer over upper region 940 defines a liquid crystal alignment direction 954 that is different than the alignment direction 934 over display area 916. Thus, ions in the liquid crystal layer over upper region 940 will migrate in the direction of the bisector 956 away from display area 916 as the pixels 910(2) within upper region 940 are modulated.

Similarly, in lower region 942 the lower alignment layer defines a liquid crystal alignment direction 962 that is also different than the alignment direction 932 over display area 916. Similarly, the upper alignment layer over lower region 942 defines a liquid crystal alignment direction 964 that is different than the alignment direction 934 over display area 916. Thus, ions in the liquid crystal layer over lower region 942 will migrate in the direction of the bisector 966 away from display area 916 as pixels 910(2) within lower region 942 are modulated.

The liquid crystal alignment directions for right region 944 and left region 946 are also selected to promote ion migration away from display area 916. For example, lower and upper alignment layers for right region 944 define liquid crystal alignment directions 972 and 974, respectively, which promote ion migration in a rightward direction defined by bisector 976 away from display area 916. Conversely, the lower and upper alignment layers for left region 946 define liquid crystal alignment directions 982 and 984, respectively, which promote ion migration leftward in the direction of bisector 986 and away from display area 916.

Thus, each of lower and upper alignment layers of LCD device 900 define a plurality of liquid crystal alignment directions. More particularly, each of lower and upper alignment layers defines a particular liquid crystal alignment direction (directions 932 and 934, respectively) over display area 916 and at least one different liquid crystal alignment direction (e.g., directions 952 and 954 respectively, directions 972 and 974 respectively, etc.) over border area 918. Stated another way, a plurality of different regions (e.g., regions 940-946, etc.) can be defined over border area 918, and each of the alignment layers can define a liquid crystal alignment direction over each of the regions that is different than the corresponding liquid crystal alignment directions over display area 916. Additionally, while some alignment directions over the different regions of border area are shown to be parallel (e.g., alignment directions 954 and 964, 972 and 982, etc.), in other embodiments, each of the alignment directions for each of the regions of border area 918 can be unique.

Advantageously, the liquid crystal alignment directions defined by the liquid crystal alignment layers over border area 918 can be chosen to promote ion migration away from display area 916. The liquid crystal alignment directions over border area 918 can also be chosen based on the direction of ion migration 936 through display area 916. For example, if the directors over display area 916 still caused too many ions to congregate in the lower right corner of LCD device 900, then the directors in lower region 942 and right region 944 could be modified to point the ion migration directions 966 and 976 away from the lower-right corner of pixel array 908. Thus, the liquid crystal alignment directions of border area 918 comprise ion migration control features of the present invention.

The ion migration control features of FIG. 9 can also be combined with other ion migration control features disclosed herein. For example, LCD device 916 includes an ion retention region 948 formed around border area 918. Like ion retention region 248, ion retention region 948 receives and contains migrating ions therein. Additionally, the pixels 910(2) of border area 918 can optionally be made smaller than pixels 910(1). Similarly, any beneficial display protection images can be asserted on pixels 910(2) of border area 918.

Moreover, the pixels 910(2) of border area 918 can be driven with display protection images that promote or complement ion migration in the desired directions. For example, display protection images, driving voltages, and/or assertion frequencies can be selected to "push" ions toward ion retention region 948 and away from display area 916, while taking the various ion migration directions (e.g., directions 936, 956, 966, 976, 986, etc.) into account.

Figure 10:
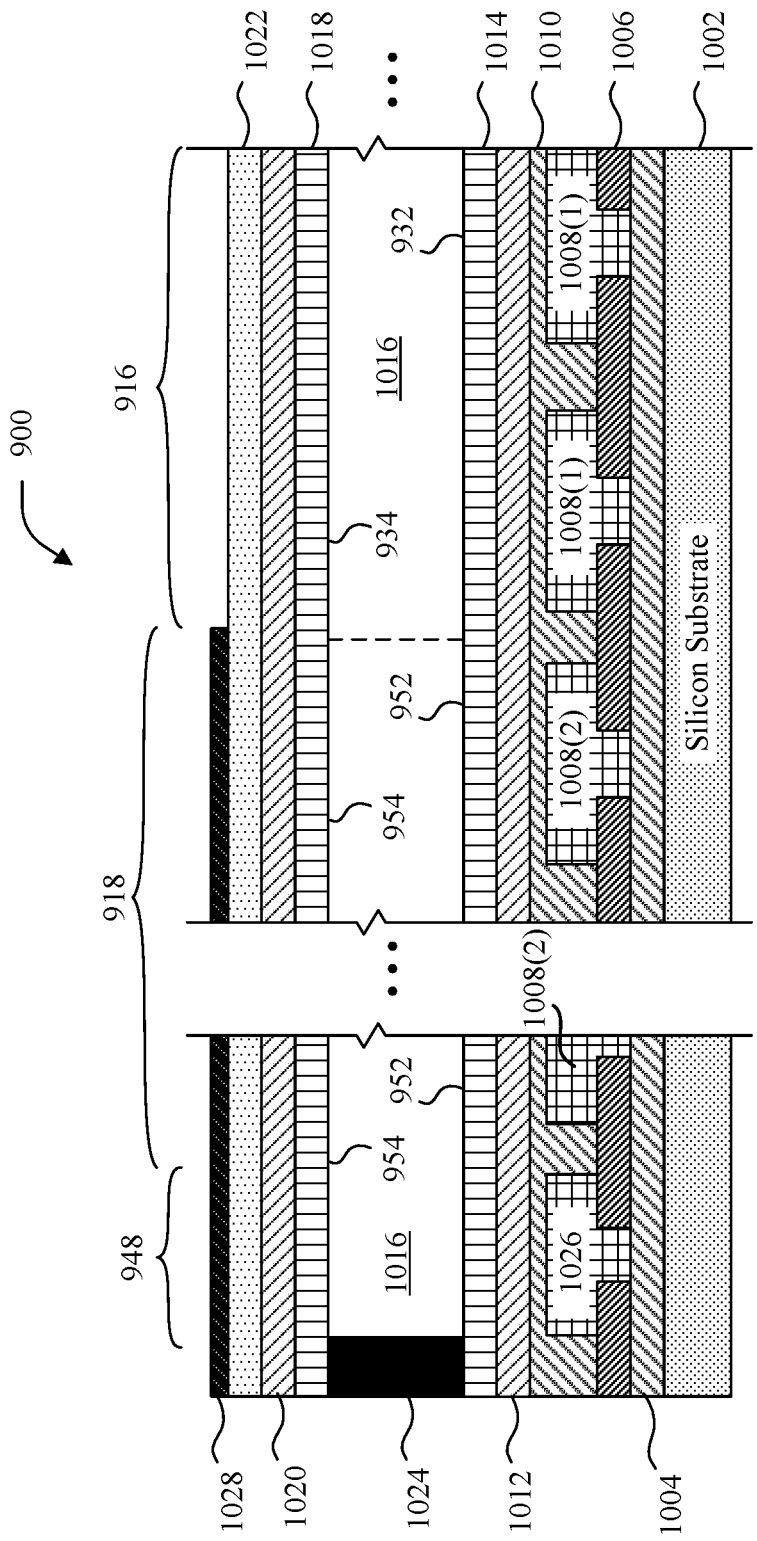
FIG. 10 is a cross-sectional view of a portion of the LCD device of FIG. 9.

FIG. 10 is a cross-sectional view of LCD device 900 taken along section line B-B of FIG. 9. The elements of FIG. 10 are representational only and may not be drawn to scale.

LCD device 900 is formed on a silicon substrate 1002 and includes integrated circuitry 1004 (e.g., pixel driving circuitry, etc.) formed over substrate 1002, an insulating layer 1006 formed over integrated circuitry 1004, and a plurality of pixel mirrors 1008(1) associated with pixels 910(1) of display area 916 and a plurality of pixel mirrors 1008(2) associated with pixels 910(2) of border area 918 formed over insulating layer 1006 and in contact with integrated circuitry 1004. LCD device 900 further includes a planarized layer 1010 formed over pixel mirrors 1008(1-2) and a protective coating 1012 formed over planarized layer 1010. In this embodiment, pixels 910(1) of display area 916 are the same size as pixels 910(2) of border area 918 and, therefore, pixel mirrors 1008(1) and 1008(2) are the same size. In other embodiments, pixel mirrors 1008(1) and 1008(2) can be different sizes. A lower liquid crystal alignment layer 1014 is formed over pixel mirrors 1008(1-2).

LCD device 900 also includes an upper liquid crystal alignment layer 1018 formed over a transparent common electrode layer 1020 (e.g., a layer of ITO), which is formed over a transparent (e.g., glass) substrate 1022. A gasket 1024 surrounds and contains a liquid crystal layer 1016 in contact with both lower liquid crystal alignment layer 1014 and upper liquid crystal alignment layer 1018.

FIG. 10 shows that lower liquid crystal alignment layer 1014 defines a first liquid crystal alignment direction 932 over the display area 916 of pixel array 908 and at least one different liquid crystal alignment direction over at least a portion of border area 918, which in FIG. 10 is shown as liquid crystal alignment direction 952 of upper region 940 of border area 918. Similarly, upper liquid crystal alignment layer 1018 defines a liquid crystal alignment direction 934 over the display area 916 and at least one different liquid crystal alignment direction over at least a portion of border area 918, which as shown in FIG. 10, is liquid crystal alignment direction 954 of upper region 940.

LCD device 900 further includes one or more electrodes 1026, which are substantially similar to like electrodes 726 shown in FIG. 7, implementing the ion-retention region 948 around border area 918. The multiple liquid crystal alignment directions utilized by the invention enable ions in liquid crystal layer 1016 to be efficiently directed away from display area 916 to ion retention region 948, where they can be contained and not harm the image produced on display area 916. LCD device 900 can also optionally include an opaque mask 1028 (e.g., a layer of opaque material, etc.) formed over the pixel mirrors 1008(2) of border area 918 and ion-retention region 948. However, mask 1028 and/or ion retention region 948 can be eliminated where the plurality of alignment layer directors sufficiently direct migrating ions away from display area 916 when the pixels of border area 918 are driven in a dark (black) state.

FIGS. 11A-11J illustrate a method of manufacturing an LCD device (e.g., LCD device 900, etc.) where each of its lower and upper liquid crystal alignment layers define a plurality of liquid crystal alignment directions. While the following manufacturing process will be described for one LCD device 900 for the sake of clarity, it will be understood that these manufacturing processes can also be employed at the wafer level, whereby a plurality of LCD devices 900 can be manufactured generally simultaneously.

Figure 11A:
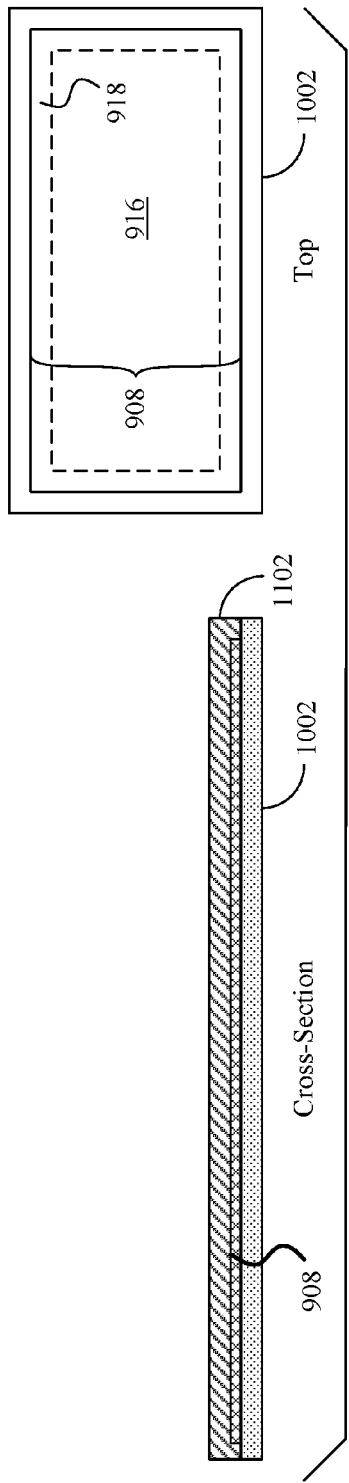
FIG. 11A shows a first step of a method of manufacturing the LCD device of FIG. 9.

FIG. 11A illustrates corresponding cross-sectional and top views of silicon substrate 1002, which has been provided for further processing. (The cross-section is taken along line C-C of FIG. 9.) As shown, silicon substrate 1002 includes pixel array 908 formed thereon (e.g., corresponding to integrated circuitry layer 1004, insulating layer 1006, pixel mirrors 1008(1-2), etc.) and the various other layers 1102 (e.g., planarization layer 1010, protective layer 1012, etc.) formed over pixel array 908. The top view shows substrate 1002, the pixel array 908 formed thereon, and delimits the perimeter of display area 916 with a dashed line. Border area 918 is the portion of pixel array 908 surrounding display area 916 outside the dashed line.

Figure 11B:
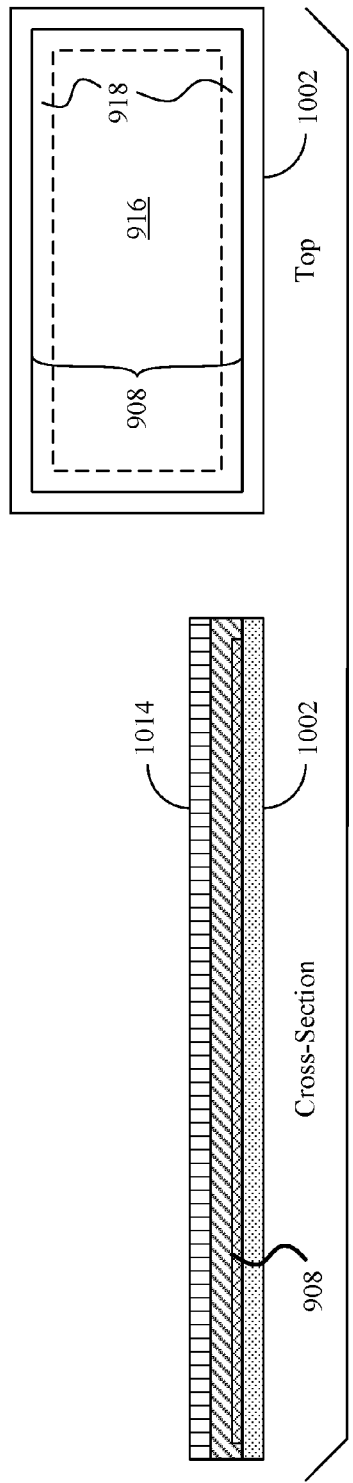
FIG. 11B shows a second step of a method of manufacturing the LCD device of FIG. 9.

FIG. 11B shows a second step where lower alignment layer 1014 is formed over silicon substrate 1002. In this embodiment, lower alignment layer 1014 is formed from a photo-alignable material (e.g., a photo-alignable polymer, etc.) that, after exposure to polarized ultraviolet (UV) light having a particular polarization direction, will cause liquid crystal molecules in a liquid crystal layer to align along the polarization direction. Lower alignment layer 1014 can be applied using any suitable method (e.g., a spin-on process, etc.). Nissan Chemical, for instance, offers several materials (e.g., product numbers RN1199, RN1286, and RN1349) that are photo-alignable and that can be spun-on and baked, similar to rub-aligned alignment layers.

Figure 11C:
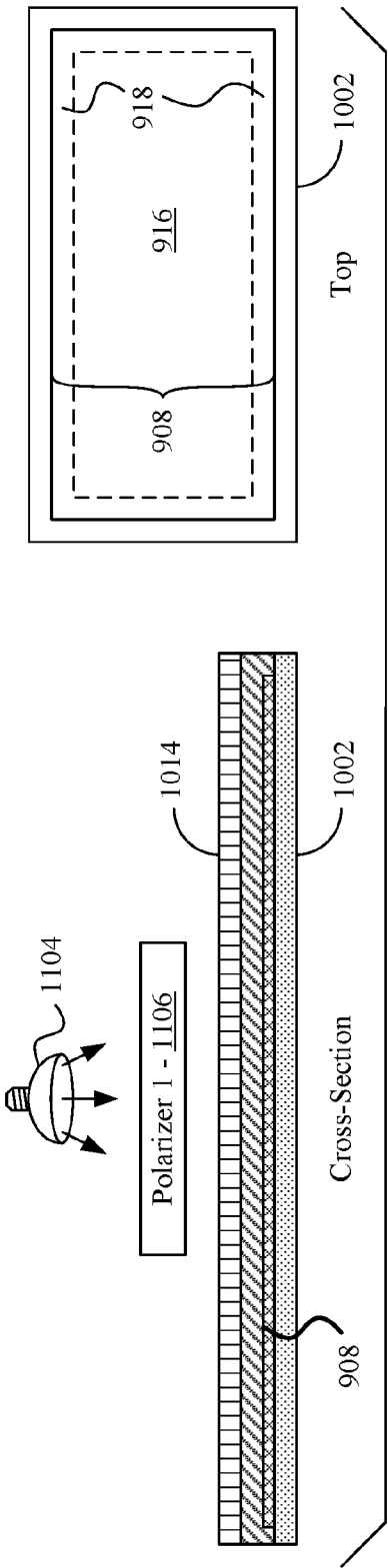
FIG. 11C shows a third step of a method of manufacturing the LCD device of FIG. 9.

FIG. 11C shows lower liquid crystal alignment layer 1014 being illuminated by UV light from a UV light source 1104 that is passed through a first polarizer 1106 having a first polarization direction corresponding to liquid crystal alignment direction 932. As shown in FIG. 11C, the entire alignment layer 1014 is photo-aligned in the direction 932. However, in other embodiments, a mask could first be applied over border area 918 to block UV light from impinging thereon.

Figure 11D:
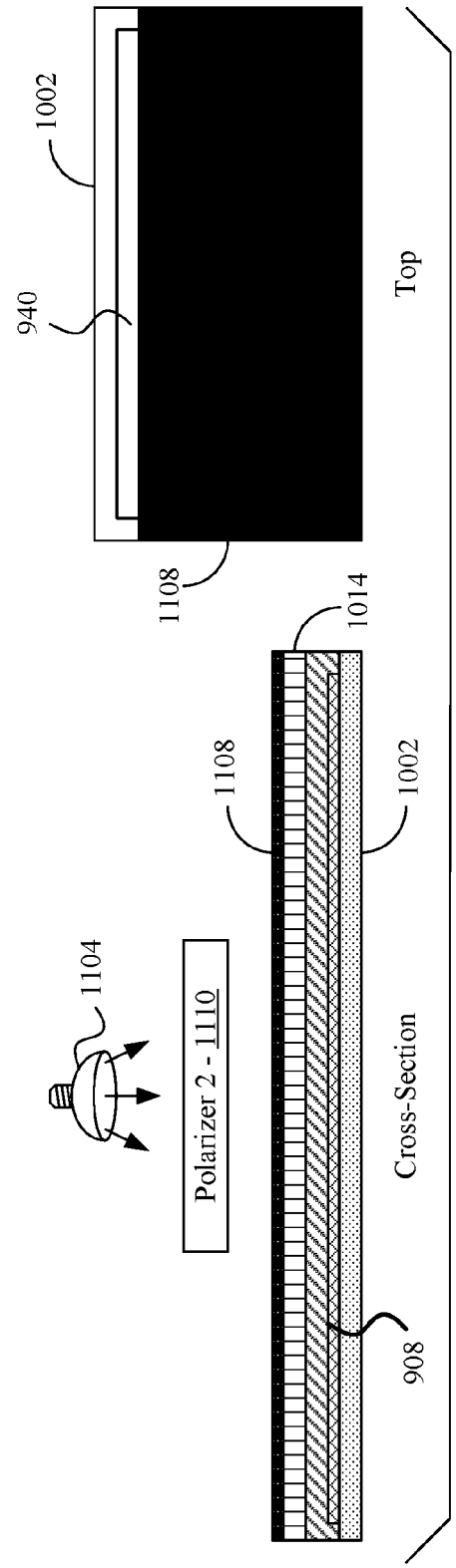
FIG. 11D shows a fourth step of a method of manufacturing the LCD device of FIG. 9.

In FIG. 11D, a mask 1108 that is impermeable to UV light is temporarily applied over alignment layer 1014. Mask 1108 covers all of alignment layer 1014 except for the portion corresponding to upper region 940 of border area 918. UV light is then passed through a second polarizer 1110 to expose upper region 940 to polarized UV light having a polarization direction corresponding to alignment direction 952 of upper region 940 of border area 918. This exposure re-aligns the alignment direction of alignment layer 1014 over upper region 940 to alignment direction 952. Thereafter, mask 1108 is removed.

In one embodiment, mask 1108 (and those described below) is a shadow mask capable of blocking UV light (e.g., a pattern of chrome applied on a glass mask plate) and is used together with a contact or proximity (non-contact) mask aligner. Projection lithography can also be used.

For a proximity-type process, the mask is placed in a mask aligner, and alignment layer 1014 is brought (e.g., by a wafer processing tool) to within a small distance of the mask. Polarized UV light then illuminates the exposed (unmasked) region of alignment layer 1014 through the mask 1108 to obtain the desired alignment direction. In the case of wafer-level processing, the mask 1108 can include a pattern formed thereon for simultaneously masking a plurality of pixel arrays 208 formed on a silicon LCOS wafer.

In FIG. 11E, another UV-impermeable mask 1114 is applied over alignment layer 1014. Mask 1114 covers all of alignment layer 1014 except for the portion corresponding to right region 944 of border area 918. UV light is then passed through a third polarizer 1116 to expose right region 944 to polarized UV light having a polarization direction corresponding to alignment direction 972. This exposure re-aligns the alignment direction of alignment layer 1014 over right region 944 to alignment direction 972. Thereafter, mask 1114 is removed.

In FIG. 11F, a UV-impermeable mask 1118 is then applied over alignment layer 1014, which covers all of alignment layer 1014 except for lower region 942 of border area 918. UV light is then passed through a fourth polarizer 1120 to expose lower region 942 to polarized UV light having a polarization direction corresponding to alignment direction 962. This exposure re-aligns the alignment direction over lower region 942 to alignment direction 962. Thereafter, mask 1118 is removed.

Figure 11G:
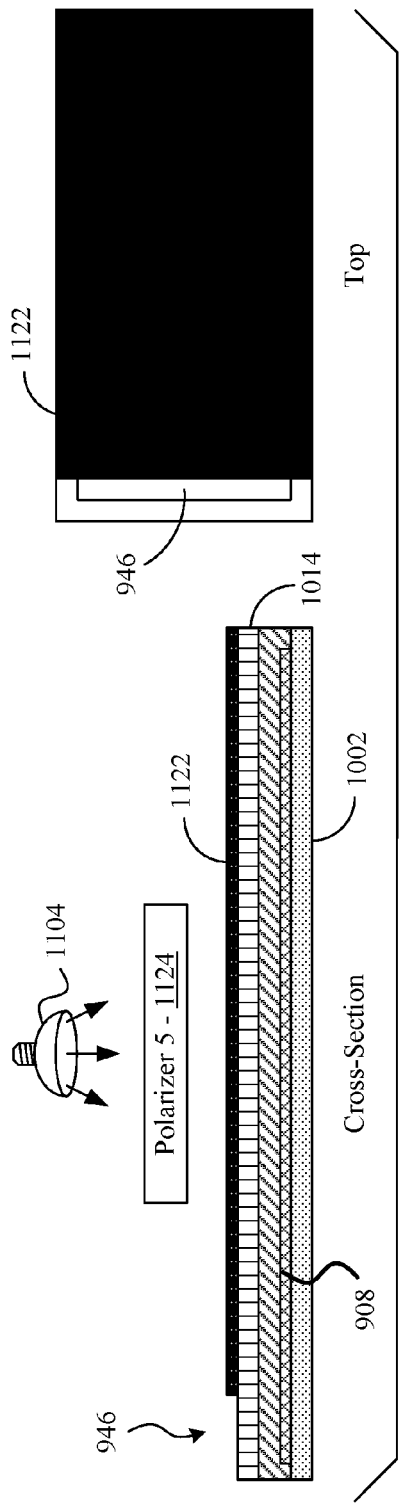
FIG. 11G shows a seventh step of a method of manufacturing the LCD device of FIG. 9.

In FIG. 11G, a UV-impermeable mask 1122 is applied over alignment layer 1014, which covers all of alignment layer 1014 except for the portion corresponding to left region 946 of border area 918. UV light is then passed through a fifth polarizer 1124 to expose left region 946 to polarized UV light having a polarization direction corresponding to alignment direction 982. Such exposure re-aligns the alignment direction of alignment layer 1014 to alignment direction 982 over left region 946. Thereafter, mask 1122 is removed.

Figure 11H:
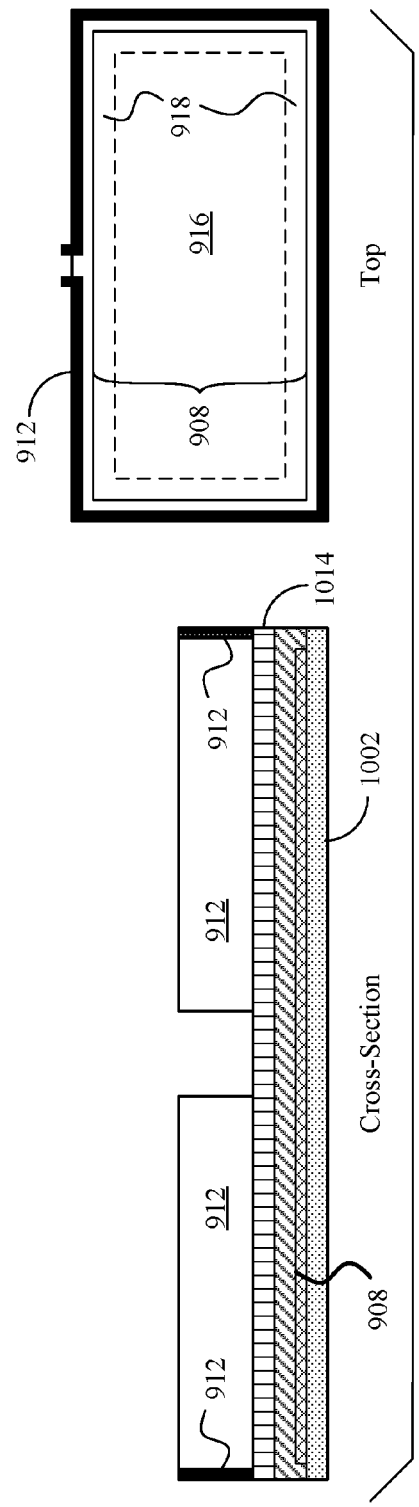
FIG. 11H shows an eighth step of a method of manufacturing the LCD device of FIG. 9.
Figure 11I:
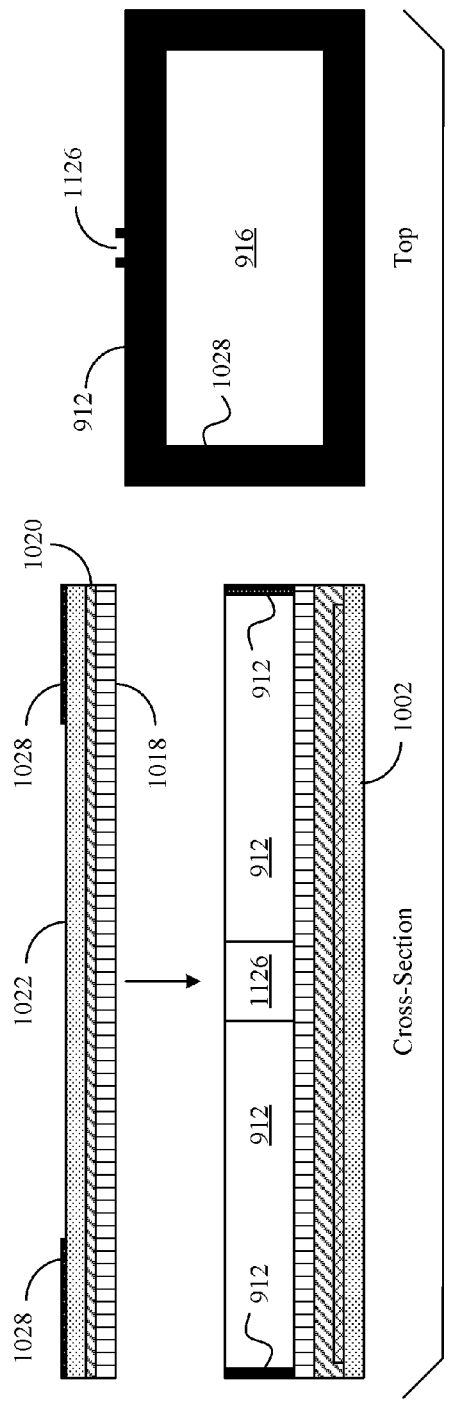
FIG. 11I shows a ninth step of a method of manufacturing the LCD device of FIG. 9.

Thereafter, as shown in FIG. 11H, gasket 912 is applied around the perimeter of border area 918. A transparent substrate 1022, having common electrode 1020, upper liquid crystal alignment layer 1018, and a mask 1028 formed thereon, is then provided as shown in FIG. 11I. Transparent substrate 1022 is then positioned over silicon substrate 1002 with upper liquid crystal alignment layer 1018 in contact with gasket 912.

Upper liquid crystal alignment layer 1018 is also formed from a photo-alignable material like lower alignment layer 1014. In the case of FIG. 11I, upper alignment layer 1018 defines a plurality of liquid crystal alignment directions, including alignment direction 934 over display area 916 and alignment directions 954, 964, 974, and 984 over upper region 940, lower region 942, right region 944, and left region 946 of border area 918, respectively. Alignment directions are formed on upper alignment layer 1018 using the same photo-alignment process as discussed above for lower liquid crystal alignment layer 1014.

Figure 11J:
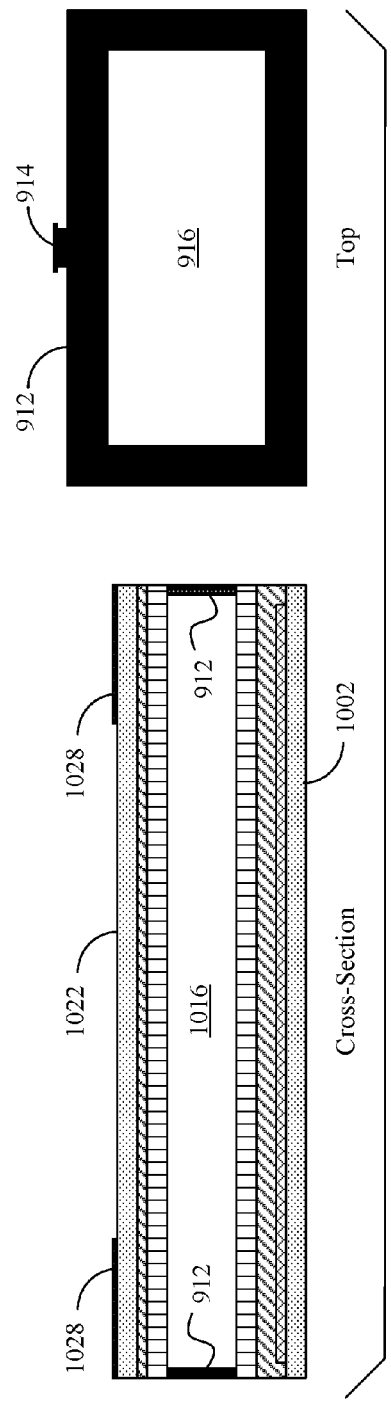
FIG. 11J shows a tenth step of a method of manufacturing the LCD device of FIG. 9.

As shown in FIG. 11J, liquid crystal material is inserted via an opening 1126 into the space defined by gasket 912 to form liquid crystal layer 1016. The alignment layers 1014 and 1018 cause the liquid crystal material to align along the desired directions. Thereafter, gasket 912 is sealed by inserting plug 914 in opening 1126.

As mentioned above, the various manufacturing processes described herein can, and often will, occur at the wafer level. For example, the processes shown and described in FIGS. 11A-11I can occur generally simultaneously for each of a plurality of dies formed on a silicon wafer, where each die is associated with one LCD device 900. Similarly, a plurality of upper alignment layers 1018 (like that shown in FIG. 11I) for a plurality of LCD devices 900 can also be formed on a transparent wafer using wafer-level processing. Furthermore, it will be understood that the plurality of LCD devices 900 formed at the wafer level will be separated at some point into individual LCD devices 900, for example, in between the manufacturing steps illustrated in FIGS. 11I and 11J.

Various modifications can be made to the process described in FIGS. 11A-11J without departing from the scope of the present invention. For example, the shape of the UV-impermeable mask can be adjusted depending on the application. For example, if two or more regions of border area 918 (e.g., upper region 940 and lower region 942, etc.) define the same alignment direction, then these regions can be photo-aligned in the same UV exposure with light having the desired polarization direction. Accordingly, two or more masking and exposure steps can be consolidated.

As another example, only one of liquid crystal alignment layers 1014 and 1018 can be made to have a plurality of alignment directions. For instance, if upper alignment layer 1018 was made with only a single alignment direction over the entire pixel array 908, then each of the alignment directions of the lower alignment layer 1014 can be selected based on this single alignment direction with the goal of promoting ion migration away from the display area. Alternatively, lower alignment layer 1014 can define only one alignment direction, and upper alignment layer 1018 can be made to define a plurality.

As still another example, the manufacturing process described above can include one or more steps for forming a UV filter over substrate 1022. For example, one or more thin-film UV filter(s) (not shown) can be placed between the panel and projection illumination source during operation. In this manner, UV light entering LCD device 900 would be filtered out and would not inadvertently realign the directors of either of alignment layers 1014 and 1018.

It should be noted that methods other than photo-alignment can be used for defining pluralities of liquid crystal alignment directions on each of liquid crystal alignment layers 1014 and 1018. For example, pattern(s) of nano-structures defining the desired liquid crystal alignment directions can be applied to liquid crystal alignment material. For example, an offset printing process for forming such patterns of nano-structures for use as an alignment layer is described in co-pending U.S. patent application Ser. No. 15/334,488, filed on Oct. 26, 2016 and is entitled "Method to Make LCOS Oxide Alignment Layer by Offset Print", which is incorporated herein by reference in its entirety.

Methods of the present invention will now be described with reference to FIGS. 12-15. For the sake of clear explanation, these methods might be described with reference to particular elements of the previously-described embodiments. However, it should be noted that other elements, whether explicitly described herein or created in view of the present disclosure, could be substituted for those cited without departing from the scope of the present invention. Therefore, it should be understood that the methods of the present invention are not limited to any particular elements that perform any particular functions. Furthermore, some steps of the methods presented herein need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 12:
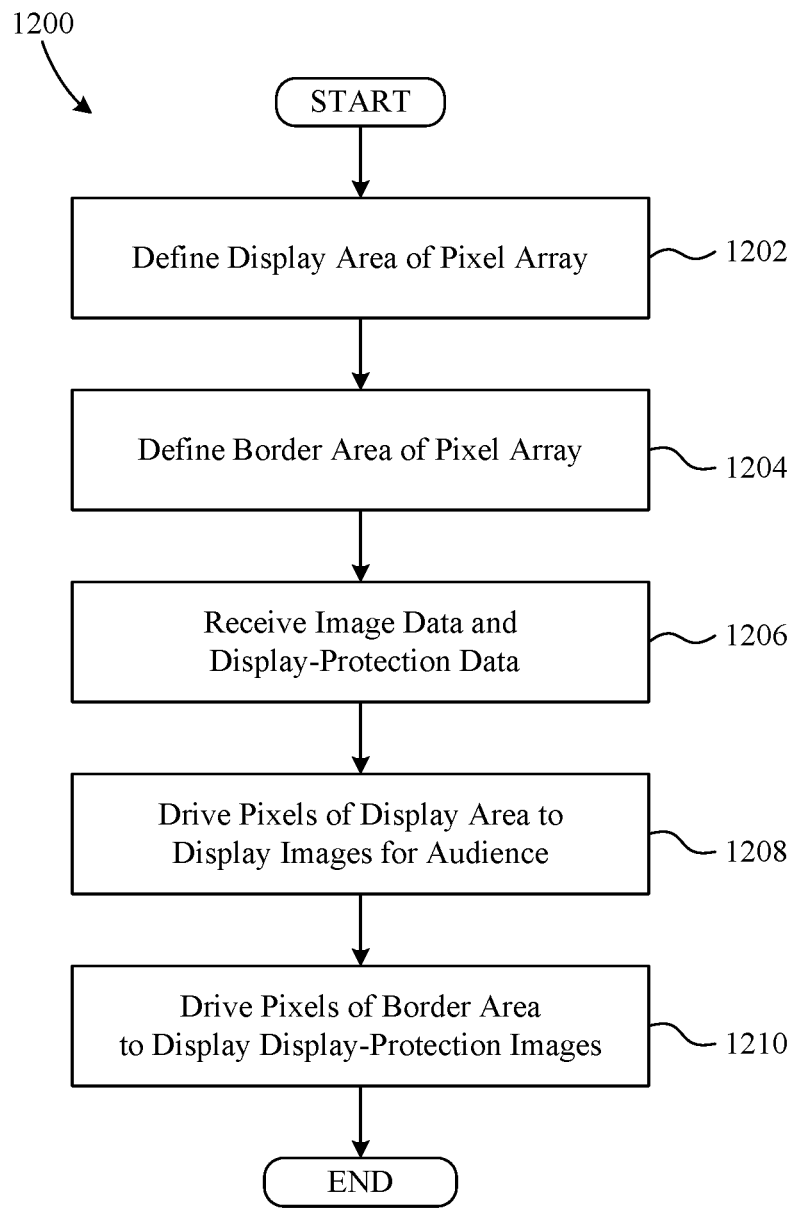
FIG. 12 is a flowchart summarizing a method of driving a liquid crystal display device according to the present invention.

FIG. 12 is a flowchart summarizing a method 1200 for driving a liquid crystal display having a pixel array and a liquid crystal layer disposed over said pixel array with display protection images according to the present invention. In a first step 1202, a display area of the pixel array is defined, where the display area is associated with a first set of pixels of the pixel array. In a second step 1204, a border area of the pixel array is defined, where the border area is associated with a second set of pixels of the pixel array. In a third step 1206, image data and display-protection data are received. Then in a fourth step 1208, the first set of pixels is driven based on the image data to display images on the display area that are intended to be viewed by an audience, and in a fifth step 1210, the second set of pixels are driven based on the display protection data to display display-protection images on the border area.

Figure 13:
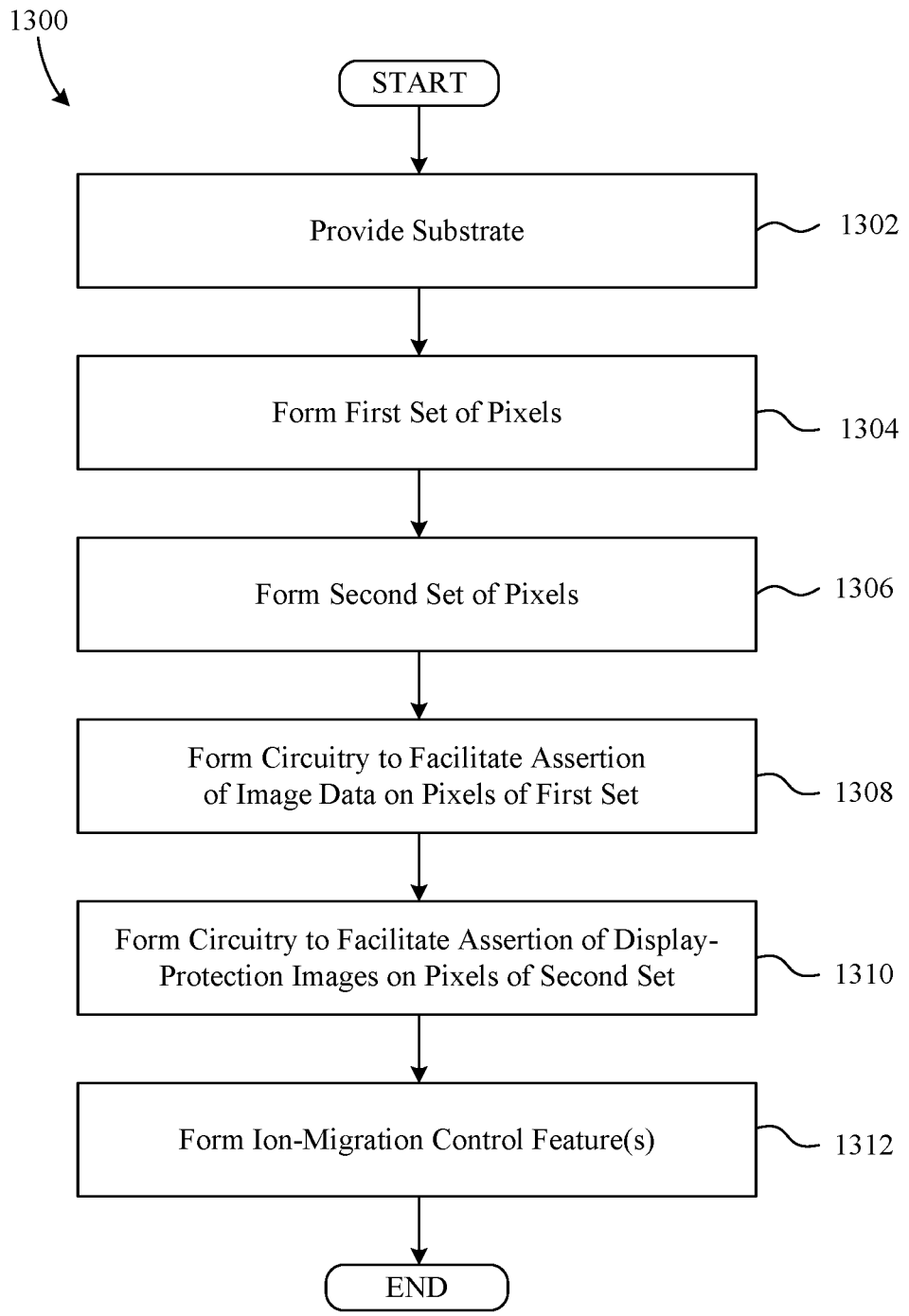
FIG. 13 is a flowchart summarizing a method of manufacturing a liquid crystal display device according to the present invention.

FIG. 13 is a flowchart summarizing a method 1300 for manufacturing a liquid crystal display according to the present invention. In a first step 1302, a substrate (e.g., a silicon wafer, etc.) is provided. Then, in a second step 1304, a first set of pixels corresponding to a display area of a pixel array is formed on the substrate, and in a third step 1306, a second set of pixels corresponding to a border area of the pixel array is formed on the substrate. In a fourth step 1308, circuitry facilitating the assertion of image data on the first set of pixels is formed on the substrate, where the image data is associated with images intended to be viewed by an audience. In a fifth step 1310, circuitry facilitating the assertion of display protection images on the second set of pixels is formed on the substrate. In a sixth step 1312, at least one ion-migration control feature is formed at least partially around the first set of pixels.

Figure 14:
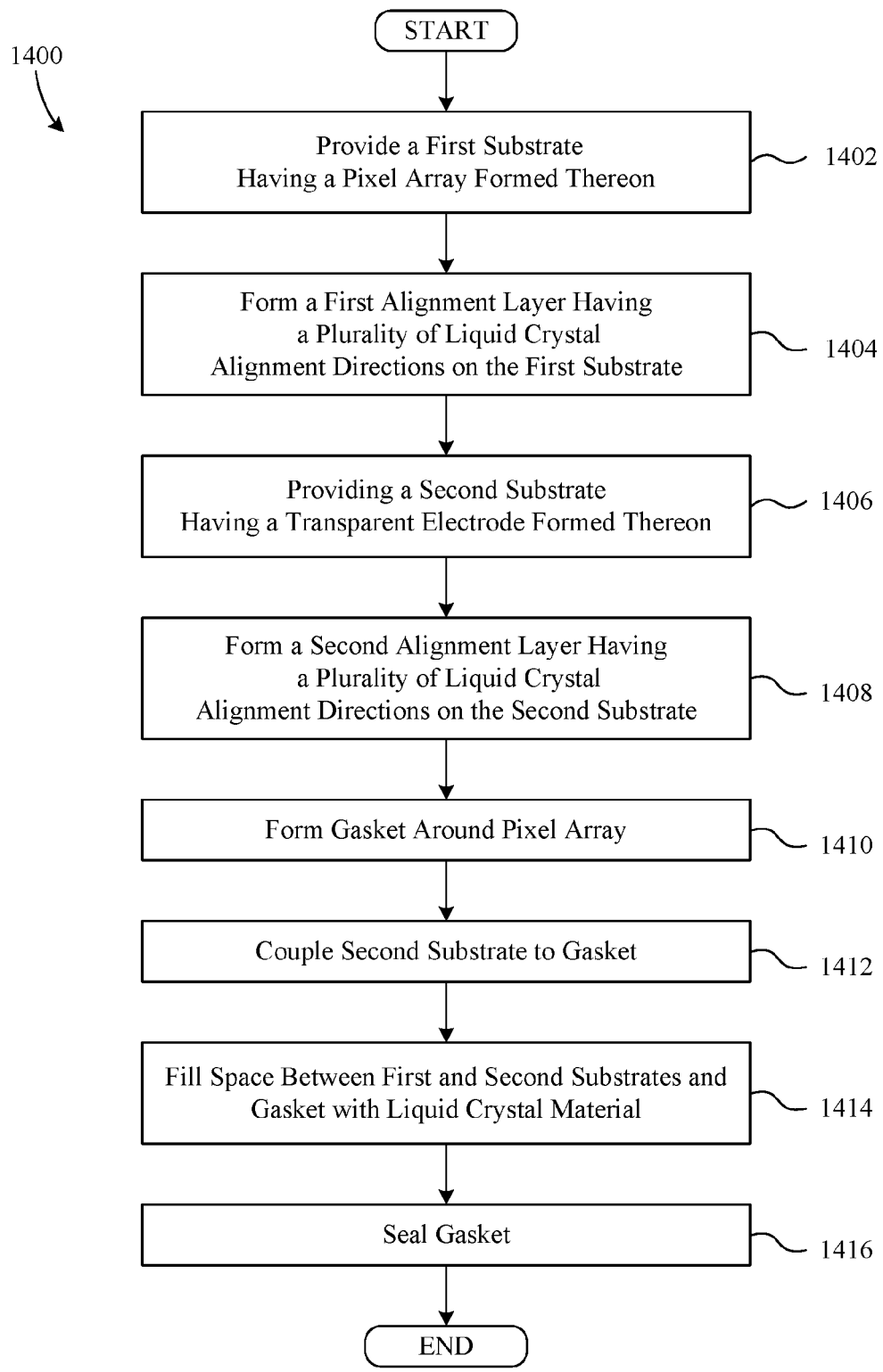
FIG. 14 is a flowchart summarizing another method of manufacturing a liquid crystal display device according to the present invention.

FIG. 14 is a flowchart summarizing another method 1400 for manufacturing a liquid crystal display device according to the invention. In a first step 1402, a first substrate (e.g., a silicon substrate) having a pixel array formed thereon is provided, and in a second step 1404, a first liquid crystal alignment layer defining a plurality of liquid crystal alignment directions is formed over the first substrate. In a third step 1406, a second substrate having a transparent electrode formed thereon is provided, and in a fourth step 1408, a second liquid crystal alignment layer defining a plurality of liquid crystal alignment directions is formed over the second substrate. In a fifth step 1410, a gasket is formed on the first substrate around the pixel array, and in a sixth step 1412, the second substrate is coupled to the gasket so that the first and second alignment layers face each other. Then, in a seventh step 1414, the space defined between the first and second substrates and the gasket is filled with liquid crystal material, and in an eighth step 1416, the gasket is sealed with a plug.

Figure 15:
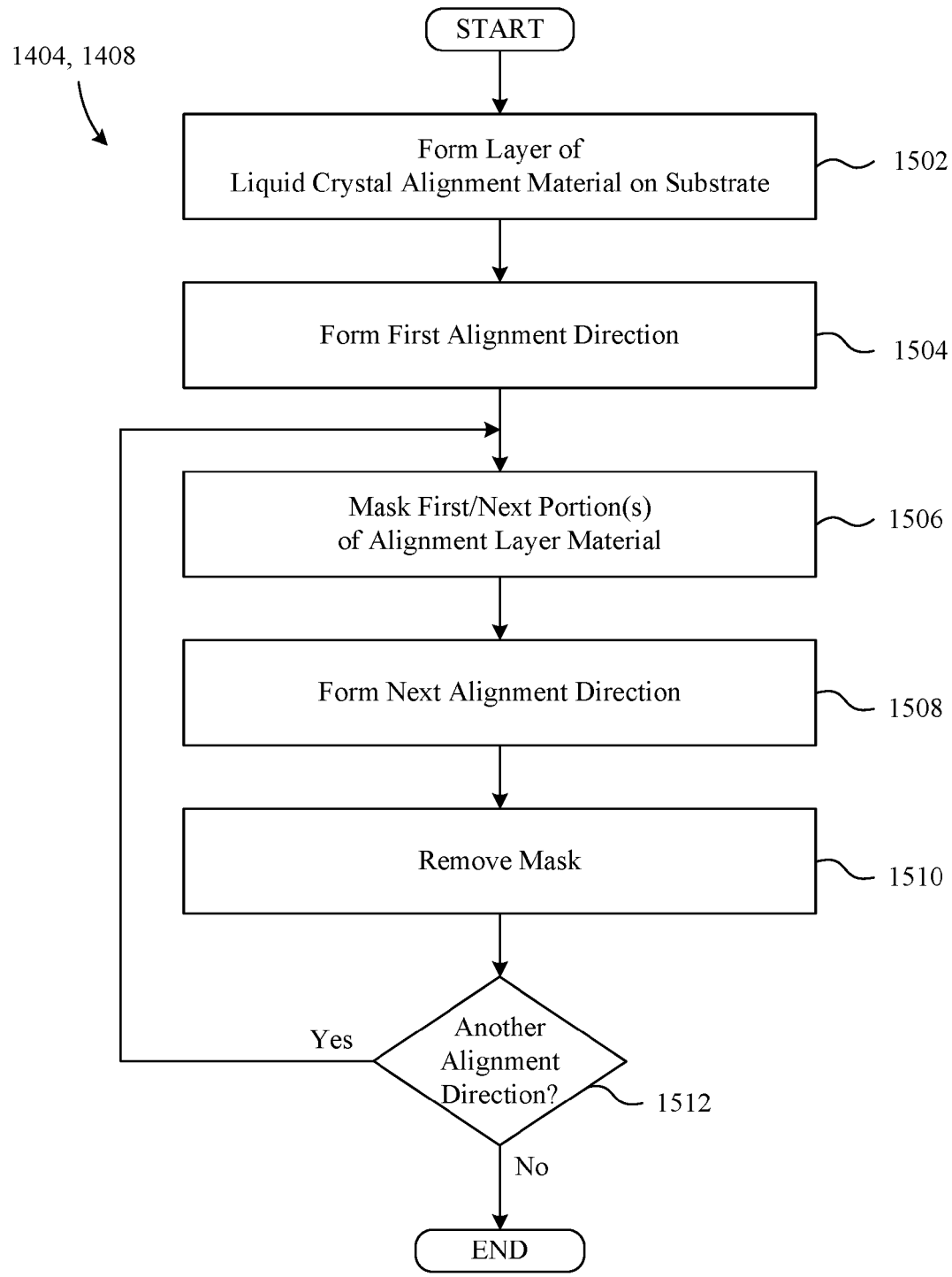
FIG. 15 is a flowchart summarizing a method of performing the second and/or fourth step(s) of FIG. 14.

FIG. 15 is a flowchart summarizing a method of performing the second and/or fourth steps 1404 and/or 1408 (form alignment layer defining a plurality of alignment directions) of the method 1400. In a first step 1502, a layer of liquid crystal alignment material is formed on the substrate, and in a second step 1504, a first alignment direction is formed on the substrate, for example, by exposing the liquid crystal alignment material to UV light having a first polarization direction. Then, in a third step 1506, a mask is applied over a portion of the alignment layer material, and in a fourth step 1508, a second alignment direction is formed on the unmasked portion of the alignment layer material by exposing the unmasked portion of the alignment layer material to UV light having a second polarization direction. Then, in a fifth step 1510, the mask is removed. Next, in a sixth step 1512, it is determined whether another alignment direction needs to be formed on the liquid crystal alignment material. If so, then the method returns to step 1506. Otherwise the method ends.

Optionally, the liquid crystal alignment material can be masked prior to forming the first liquid crystal alignment direction (e.g., to cover those areas that are not going to have the first alignment direction, etc.) and, after exposure, such mask can be removed prior to step 1506.

The description of particular embodiments of the present invention is now complete. Many of the described features may be substituted, altered or omitted without departing from the scope of the invention. For example, alternative display-protection patterns (e.g., alternating rows or columns), may be substituted for the checkerboard patterns discussed above. As another example, different frequencies and voltage amplitudes can be used for driving pixels in various regions of the border area. As yet another example, voltage generators can be used to directly assert display protection patterns on the border area (e.g., based on display-protection data/settings) instead of writing data bits to pixels of the border area. These and other deviations from the particular embodiments shown will be apparent to those skilled in the art, particularly in view of the foregoing disclosure.

We claim:
1. A liquid crystal display comprising:
a pixel array;
a liquid crystal layer disposed over said pixel array; and
a controller coupled to receive image data and being operative to drive a first set of pixels defining a display area of said pixel array based on said image data and to drive a second set of pixels defining a border area of said pixel array based on display-protection data; and wherein said pixels of said display area are driven to display images corresponding to said image data, which are intended to be viewed by an audience; and said pixels of said border area are driven to display display-protection images corresponding to said display-protection data; and wherein said pixels of said first set of pixels and said second set of pixels are each coupled to a row select line and a data line, whereby each pixel is individually addressable for writing said image data to said pixels of said first set and said display-protection data to said pixels of said second set; and said pixel array is embodied in a silicon substrate including integrated circuitry and a plurality of pixel mirrors.

2. The liquid crystal display of claim 1, wherein said display-protection images comprise a series of checkerboard patterns.

3. The liquid crystal display of claim 1, wherein said controller is further operative to:
define a plurality of groups of pixels in said border area; and
drive each of said plurality of groups of pixels differently based on said display protection data.

4. The liquid crystal display of claim 1, wherein said pixels of said border area are smaller than said pixels of said display area.

5. The liquid crystal display of claim 1, wherein:
said pixel array further includes an ion reservoir area at least partially surrounding said border area;
said liquid crystal layer is disposed over said ion reservoir area; and
said ion reservoir area is configured to receive and contain ions migrating in said liquid crystal layer.

6. The liquid crystal display of claim 1, further comprising:
a liquid crystal alignment layer over said pixel array; and wherein
said liquid crystal alignment layer defines a first liquid crystal alignment direction over said display area and a second liquid crystal alignment direction over said border area; and
said second liquid crystal alignment direction is different than said first alignment direction.

7. The liquid crystal display of claim 6, wherein:
said liquid crystal alignment layer defines a plurality of liquid crystal alignment directions over said border area; and
each of said plurality of liquid crystal alignment directions over said border area is different than said first liquid crystal alignment direction.

8. The liquid crystal display of claim 7, wherein each of said plurality of liquid crystal alignment directions over said border area is selected to promote ion migration in said liquid crystal layer away from said display area.

9. The liquid crystal display of claim 1, wherein said pixels of said first set of pixels and said pixels of said second set of pixels have substantially similar shapes.

10. The liquid crystal display of claim 1, wherein said pixels of said first set of pixels and said pixels of said second set of pixels are organized in rows and columns.

11. The liquid crystal display of claim 1, wherein:
said controller is coupled to a data link to receive said image data; and said controller generates augmented data comprising said image data and said display-protection data.

12. The liquid crystal display device of claim 11, wherein said controller is further operative to adjust a size of said display area and a size of said border area based on image data received via said data link.

13. The liquid crystal display device of claim 1, wherein said controller is operative to assert a plurality of different display-protection images on said pixels of said second set.

14. A method for driving a liquid crystal display having a pixel array and a liquid crystal layer disposed over said pixel array, said method comprising:
defining a display area of said pixel array, said display area being associated with a first set of pixels of said pixel array;
defining a border area of said pixel array, said border area being associated with a second set of pixels of said pixel array;
receiving image data and display-protection data;
combining said image data and said display protection data to create augmented data;
storing said augmented data;
transferring bits of said augmented data to each pixel of said display using a data line and a row select line;
driving said first set of pixels based on said image data to display images intended to be viewed by an audience on said display area; and
driving said second set of pixels based on said display-protection data to display display-protection images on said border area.

15. The method of claim 14, wherein said display-protection images inhibit ion migration in said liquid crystal layer.

16. The method of claim 15, further comprising:
defining a plurality of groups of pixels in said border area; and
driving each of said plurality of groups of pixels differently based on said display-protection data.

17. The method of claim 16, further comprising:
asserting a first voltage on each of a first group of pixels of said border area during a first time interval to cause a first predetermined voltage to be applied across said liquid crystal layer for each of said pixels of said first group; and
asserting a second voltage on each of a second group of pixels of said border area during said first time interval to cause a second predetermined voltage to be applied across said liquid crystal layer for each of said pixels of said second group.

18. The method of claim 17, further comprising:
asserting a third voltage on each of said pixels of said first group during a second time interval following said first time interval to cause said second predetermined voltage to be applied across said liquid crystal layer for each of said pixels of said first group; and
asserting a fourth voltage on each of said pixels of said second group during said second time interval to cause said first predetermined voltage to be applied across said liquid crystal layer for each of said pixels of said second group.

19. The method of claim 18, further comprising selecting at least one of said first voltage, said second voltage, said third voltage, said fourth voltage, the duration of said first time interval, and the duration of said second time interval to affect at least one of the speed and direction of ion migration in said liquid crystal layer.

20. The method of claim 14, further comprising:
defining a plurality of regions within said border area;
defining a plurality of groups of pixels within each of said regions; and
driving each of said groups of pixels differently based on which region said group of pixels is located in.

21. The method of claim 14, wherein said step of driving said second set of pixels further includes driving said second set of pixels based on a liquid crystal alignment direction of said liquid crystal layer over said second set of pixels.

22. A method for manufacturing a liquid crystal display, said method comprising:
providing a silicon substrate including integrated circuitry;
forming a first set of pixel mirrors on said silicon substrate, said first set of pixel mirrors corresponding to a display area of a pixel array;
forming a second set of pixel mirrors on said silicon substrate, said second set of pixel mirrors corresponding to a border area of said pixel array;
forming circuitry facilitating the assertion of image data on said first set of pixel mirrors to display images intended to be viewed by an audience, said circuitry facilitating the assertion of said image data on said first set of pixel mirrors including a plurality of data lines and a plurality of row select lines;
forming circuitry facilitating the assertion of display protection images on said second set of pixel mirrors, said circuitry facilitating the assertion of display protection images on said second set of pixel mirrors including said plurality of data lines and said plurality of row select lines; and
forming at least one ion-migration control feature on said substrate at least partially around said first set of pixel mirrors.

23. The method of claim 22, wherein said step of forming said at least one ion-migration control feature comprises forming at least one ion reservoir at least partially surrounding said border area.

24. The method of claim 22, wherein:
said border area at least partially surrounds said display area; and
said step of forming said at least one ion-migration control feature comprises forming at least some of said pixel mirrors of said second set smaller than adjacent ones of said pixel mirrors of said first set.

25. The method of claim 22, wherein:
said step of forming said at least one ion-migration control feature comprises-forming a liquid crystal alignment layer over said substrate;
said liquid crystal alignment layer defines a first liquid crystal alignment direction over said display area and a second liquid crystal alignment direction over said border area; and
said second liquid crystal alignment direction is different than said first liquid crystal alignment direction.

* * * * *